(12) United States Patent
Ou et al.

(10) Patent No.: US 11,086,131 B2
(45) Date of Patent: Aug. 10, 2021

(54) NEAR-EYE DISPLAY AND NEAR-EYE DISPLAY SYSTEM

(71) Applicant: HUAWEI TECHNOLOGIES CO., LTD., Guangdong (CN)

(72) Inventors: Jian Ou, Dongguan (CN); Ying Liang, Dongguan (CN); Songlin Li, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 123 days.

(21) Appl. No.: 16/577,809

(22) Filed: Sep. 20, 2019

(65) Prior Publication Data

US 2020/0018969 A1 Jan. 16, 2020

Related U.S. Application Data

(63) Continuation of application No. PCT/CN2018/072290, filed on Jan. 11, 2018.

(30) Foreign Application Priority Data

Mar. 23, 2017 (CN) .......................... 201710178974.2
Jul. 19, 2017 (CN) .......................... 201710592620.2

(51) Int. Cl.
  *G02B 27/01* (2006.01)
(52) U.S. Cl.
  CPC .. *G02B 27/0172* (2013.01); *G02B 2027/0123* (2013.01); *G02B 2027/0178* (2013.01)
(58) Field of Classification Search
  CPC ........ G02B 27/0172; G02B 2027/0123; G02B 2027/0178; G02B 2027/0116;
  (Continued)

(56) References Cited

U.S. PATENT DOCUMENTS 8,582,209 B1 * 11/2013 Amirparviz .......... G02B 5/0294
  359/630
2005/0002204 A1 1/2005 Lin et al.
(Continued)

FOREIGN PATENT DOCUMENTS

CN 1664652 A 9/2005
CN 101263406 A 9/2008
(Continued)

*Primary Examiner* — Chad M Dicke
(74) *Attorney, Agent, or Firm* — Womble Bond Dickinson (US) LLP

(57) ABSTRACT

A near-eye display and a near-eye display system are provided. The near-eye display includes a display panel, a collimation lens component, and an optical redirector. The display panel includes a plurality of pixels that are disposed in a tiling manner. The collimation lens component includes a plurality of collimation lenses, and the plurality of collimation lenses are in a one-to-one correspondence with the plurality of pixels. Each of the plurality of collimation lenses is configured to: convert, into collimated light, light emitted by a corresponding pixel, and input the collimated light into the optical redirector. The optical redirector includes a plurality of light convergence structures, and the plurality of light convergence structures are in a one-to-one correspondence with the plurality of collimation lenses. Each of the plurality of light convergence structures is configured to converge, on a focus of the near-eye display, collimated light input by a corresponding collimation lens.

18 Claims, 13 Drawing Sheets

(58) Field of Classification Search
CPC .... G02B 5/045; G02B 3/0043; G02B 3/0056; G02B 3/0068; G02B 17/002
See application file for complete search history.

(56) References Cited

U.S. PATENT DOCUMENTS

| | | |
|---|---|---|
| 2005/0180004 A1 | 8/2005 | Sekiguchi |
| 2005/0195491 A1 | 9/2005 | Bernard et al. |
| 2008/0204901 A1 | 8/2008 | Amano et al. |
| 2010/0149618 A1 | 6/2010 | Sprague |
| 2012/0154920 A1 | 6/2012 | Harrison et al. |
| 2014/0043320 A1 | 2/2014 | Tosaya et al. |
| 2014/0071556 A1 | 3/2014 | Goo et al. |
| 2014/0091990 A1* | 4/2014 | Chang ................ G02B 27/0172 345/8 |
| 2014/0118829 A1 | 5/2014 | Ma et al. |
| 2018/0011325 A1* | 1/2018 | Yang ........................ G02B 3/08 |
| 2019/0018244 A1 | 1/2019 | Tan |

FOREIGN PATENT DOCUMENTS

| | | |
|---|---|---|
| CN | 103348278 A | 10/2013 |
| CN | 103713388 A | 4/2014 |
| CN | 105842906 A | 8/2016 |
| CN | 106199962 A | 12/2016 |
| CN | 106526864 A | 3/2017 |
| CN | 107300770 A | 10/2017 |
| CN | 107329267 A | 11/2017 |
| CN | 107490862 A | 12/2017 |
| DE | 102014207500 B3 | 5/2015 |
| JP | 2002023161 A | 1/2002 |
| JP | 2005316270 A | 11/2005 |
| JP | 2008134341 A | 6/2008 |

\* cited by examiner

NEAR-EYE DISPLAY AND NEAR-EYE DISPLAY SYSTEM

CROSS-REFERENCE TO RELATED APPLICATIONS

This application is a continuation of International Application No. PCT/CN2018/072290, filed on Jan. 11, 2018, which claims the priority to Chinese Patent Application No. 201710178974.2, filed on Mar. 23, 2017 and Chinese Patent Application No. 201710592620.2, filed on Jul. 19, 2017. The disclosures of the aforementioned applications are hereby incorporated by reference in their entireties.

TECHNICAL FIELD

Embodiments of this application relate to the display field, and more specifically, to a near-eye display and a near-eye display system.

BACKGROUND

An augmented reality (AR) near-eye display technology is a technology of displaying a virtual image generated by a near-eye display and a real-view image in the real world through superimposition, so that a user can view a final augmented real-view image on a screen.

As shown in FIG. 1, a background 02 is a real-view image, and a time 01 displayed in the middle is a virtual image generated by the near-eye display. The near-eye display is usually worn on eyes of the user. For example, the near-eye display is usually presented in a form of eyeglasses, and a screen of the near-eye display is lenses of the eyeglasses. Generally, the near-eye display includes a projection part, and light of an image that is generated by the projection part is projected on a retina in a human eye after being reflected many times.

The near-eye display in the prior art has a relatively narrow field of view (FOV). As a result, user experience is relatively poor.

SUMMARY

Embodiments of this application provide a near-eye display and a near-eye display system, so as to resolve a prior-art problem that a near-eye display has a relatively narrow field of view, and consequently user experience is relatively poor.

According to a first aspect, a near-eye display is provided, including a display panel, and a collimation lens component and an optical redirector that are successively disposed on a light emitting side of the display panel, where the display panel includes a plurality of pixels that are disposed in a tiling manner, every two adjacent pixels in the plurality of pixels are disposed with a spacing therebetween, and a light-transmissive transparent substrate material is filled between every two adjacent pixels;

the collimation lens component includes a plurality of collimation lenses, the plurality of collimation lenses are in a one-to-one correspondence with the plurality of pixels, each of the plurality of collimation lenses is configured to: convert, into collimated light, light emitted by a corresponding pixel, and input the collimated light into the optical redirector, every two adjacent collimation lenses in the plurality of collimation lenses are disposed with a spacing therebetween, and a light-transmissive transparent substrate material is filled between every two adjacent collimation lenses; and the optical redirector includes a plurality of light convergence structures, the plurality of light convergence structures are in a one-to-one correspondence with the plurality of collimation lenses, each of the plurality of light convergence structures is configured to converge, on a focus of the near-eye display, collimated light input by a corresponding collimation lens, the focus of the near-eye display falls within an eyeball of a user, every two adjacent light convergence structures in the plurality of light convergence structures are disposed with a spacing therebetween, and a light-transmissive transparent substrate material is filled between every two adjacent light convergence structures.

In the near-eye display in this embodiment of this application, the optical redirector is disposed on the light emitting side of the display panel, to reflect or refract an image displayed on the display panel to an eye of the user. In addition, external real-view light passes through the transparent substrate material between the pixels and enters the eye of the user, so as to implement AR display by superimposing a virtual image displayed on the display panel and a real-view image. In addition, the pixels are arranged on the entire display panel, so as to provide a relatively large field of view and improve visual experience of the user. In addition, the collimation lens component is disposed, to improve imaging quality of the near-eye display.

In one embodiment, a pixel, a collimation lens, and a refraction structure are bonded with each other as a pixel component. In this way, the near-eye display may include a plurality of pixel components that are disposed with a spacing therebetween, and a transparent substrate material is filled between every two adjacent pixel components.

In one embodiment, each of the plurality of pixels includes at least one light emitting unit, a collimation lens corresponding to each pixel includes at least one collimation sub-lens that is in a one-to-one correspondence with the at least one light emitting unit, and each collimation sub-lens converts, into collimated light, light emitted by a light emitting unit corresponding to each collimation sub-lens.

In one embodiment, each pixel includes a red light emitting unit, a green light emitting unit, and a blue light emitting unit, each collimation lens includes three collimation sub-lenses, and a red light emitting unit, a green light emitting unit, and a blue light emitting unit in a same pixel are in a one-to-one correspondence with three collimation sub-lenses in a same collimation lens; and a minimum distance T from each of the red light emitting unit, the green light emitting unit, and the blue light emitting unit in the same pixel to each corresponding collimation sub-lens meets the following formula:

$$T = \frac{n_r}{n_r - n_{fr}} \times R_r = \frac{n_g}{n_g - n_{fg}} \times R_g = \frac{n_b}{n_b - n_{fb}} \times R_b,$$

where $R_r$, $R_g$, and $R_b$ are respectively curvature radiuses of the collimation sub-lenses respectively corresponding to the red light emitting unit, the green light emitting unit, and the blue light emitting unit in the same pixel, $n_r$, $n_g$, and $n_b$ are respectively refractive indexes of substrate materials of the collimation sub-lenses in red light, green light, and blue light, and $n_{fr}$, $n_{fg}$, and $n_{fb}$ are respectively refractive indexes of filling materials between the collimation sub-lenses and corresponding light convergence structures in the red light, the green light, and the blue light.

Optionally, a light shielding groove is disposed between two adjacent collimation sub-lenses in a same collimation lens, and the light shielding groove is filled with a light absorption material. In this way, mutual interference between light emitted by adjacent light emitting units can be avoided.

In one embodiment, a light convergence structure corresponding to each collimation lens includes a light convergence sub-structure that is in a one-to-one correspondence with the at least one collimation sub-lens, and each light convergence sub-structure converges, on the focus of the near-eye display, collimated light emitted by a collimation sub-lens corresponding to each light convergence sub-structure.

In one embodiment, the light convergence sub-structure is a refraction structure, the refraction structure includes a first refraction surface, and the first refraction surface refracts, to the focus of the near-eye display, collimated light emitted by a collimation sub-lens corresponding to the refraction structure.

In this way, the refraction structure can refract, to the focus of the near-eye display, the light emitted by the pixel. In addition, the external real-view light can pass through the transparent substrate material and enter the eye of the user, so as to implement AR display by superimposing the virtual image displayed on the display panel and the real-view image.

In one embodiment, the first refraction surface is a first refraction plane, the first refraction plane is located on a side that is of the refraction structure and that is close to the display panel, a line of intersection exists between a plane in which the refraction plane is located and a plane in which a second refraction plane that is of the refraction structure and that is away from the display panel is located, a minimum included angle between the line of intersection and an x-axis is $\Phi$, the x-axis is a straight line, the x-axis is parallel to a straight line on which a line between centers of two eyeballs of the user is located, and $\Phi$ meets the following formula:

$$\Phi = \arctan\left(\frac{L}{D}\right);$$

and a minimum included angle $\theta$ between a plane in which each first refraction plane is located and the plane in which the second refraction plane of the refraction structure is located meets the following formula:

$$\theta = \arg\cotan\left(\frac{n \times \cos\left(\arg\sin\left(\frac{\mu}{n}\right)\right) - n_f}{\mu}\right),$$

$$\text{where } \mu = \frac{\sqrt{D^2 + L^2}}{\sqrt{D^2 + L^2 + r^2}},$$

and

D is a distance from a central point of each first refraction plane to the x-axis, L is a distance from the central point of each first refraction plane to a y-axis, n is a refractive index of a substrate material of the refraction structure, $n_f$ is a refractive index of a filling material between the refraction structure and a corresponding collimation sub-structure, r is a curvature radius of a near-eye display field-of-view arc surface, the y-axis is perpendicular to the x-axis, a plane in which the x-axis and the y-axis are located is a plane in which a surface that is of the display panel and that is away from the light emitting side is located, a straight line on which a line between a point of intersection between the x-axis and the y-axis and a center of a corresponding eyeball is located is perpendicular to the plane in which the x-axis and the y-axis are located, and the corresponding eyeball means an eyeball used to receive the refracted light.

The refraction structure meets the above requirements, so that the pixels in the display panel can be clearly visualized on an eye retina of the user in a form of a full field-of-view image, and the image is not blurred due to eye zoom of the user.

Optionally, the light convergence sub-structure is a reflection structure, the reflection structure includes a first reflection surface, and the first reflection surface reflects, to the focus of the near-eye display, collimated light emitted by a collimation sub-lens corresponding to the reflection structure.

In one embodiment, the first reflection surface is a first reflection plane, the reflection structure further includes a third refraction plane, the first reflection plane totally reflects the collimated light emitted by the collimation sub-lens corresponding to the reflection structure, the totally reflected light is refracted at the third refraction plane, and the refracted light is output to the focus of the near-eye display.

In one embodiment, the reflection structure is a triangular prism, the triangular prism includes an upper surface facing the display panel, a first upper prism edge and a second upper prism edge that are opposite to each other in the upper surface, a lower prism edge away from the upper surface, the first reflection plane, and the third refraction plane, the first upper prism edge and the lower prism edge are opposite to each other and are both located in the third refraction plane, the second upper prism edge and the lower prism edge are opposite to each other and are both located in the first reflection plane, and the lower prism edge is a line of intersection between the third refraction plane and the first reflection plane; and light emitted by each of the at least one light emitting unit is input from an upper surface of a corresponding triangular prism, and is totally reflected at the first reflection plane, the totally reflected light is refracted at the third refraction plane, and the refracted light is output to the focus of the near-eye display.

In one embodiment, a minimum included angle between the lower prism edge of the triangular prism and an x-axis is $\omega$, and $\omega$ meets:

$$\omega = \arctan\left(\frac{K}{F}\right),$$

and the x-axis is a straight line, the x-axis is parallel to a straight line on which a line between centers of two eyeballs of the user is located, a y-axis is perpendicular to the x-axis, a plane in which the x-axis and the y-axis are located is a plane in which a surface that is of the display panel and that is away from the light emitting side is located, a straight line on which a line between a point of intersection between the x-axis and the y-axis and a center of a corresponding eyeball is located is perpendicular to the plane in which the surface that is of the display panel and that is away from the light emitting side is located, and the corresponding eyeball means an eyeball used to receive the refracted light; and a minimum included angle σ between the first reflection plane and the upper surface in the same triangular prism meets the following formula:

$$\sigma = \frac{1}{2}\arccos\left(-\frac{1}{m}\sin(\arctan(\eta))\right),$$

$$\text{where } \eta = \frac{r}{\sqrt{F^2 + K^2}},$$

and

F is a distance from a central point of the first reflection plane to the x-axis, K is a distance from the central point of the first reflection plane to the y-axis, m is a refractive index of a substrate material of the triangular prism, and r is a curvature radius of a near-eye display field-of-view arc surface.

In one embodiment, the curvature radius r of the near-eye display field-of-view arc surface meets the following formula:

$$r = S + P \times \arg\tan\frac{\alpha}{2},$$

where

S is a distance from a center of the display panel to a pupil center of the user, α is a maximum visual angle of the eye, and P is a pupil radius of the user.

According to a second aspect, a near-eye display is provided, including:

a display panel, where the display panel includes a plurality of pixels that are disposed in a tiling manner, every two adjacent pixels in the plurality of pixels are disposed with a spacing therebetween, and a light-transmissive transparent substrate material is filled between every two adjacent pixels; and an optical redirector that is disposed on a light emitting side of the display panel, where the optical redirector is configured to reflect or refract an image displayed on the display panel to an eye of a user.

In the near-eye display in this embodiment of this application, the optical redirector is disposed on the light emitting side of the display panel, to reflect or refract the image displayed on the display panel to the eye of the user. In addition, external real-view light passes through the transparent substrate material between the pixels and enters the eye of the user, so as to implement AR display by superimposing a virtual image displayed on the display panel and a real-view image. In addition, the pixels are arranged on the entire display panel, so as to provide a relatively large field of view and improve visual experience of the user.

Each of the plurality of pixels is configured to emit light. An image can be displayed on the display panel by controlling light emitting of the plurality of pixels in the display panel.

In one embodiment, the optical redirector may include a refraction structure and/or a reflection structure, and the image displayed on the display panel is projected into the eye of the user after refraction and/or reflection.

In one embodiment, the optical redirector is further configured to transmit the external real-view light.

In one embodiment, the display panel further includes a transparent substrate, and the plurality of pixels are disposed on the transparent substrate with a spacing therebetween. Optionally, the plurality of pixels have a same height.

In one embodiment, a height of the transparent substrate material filled between every two adjacent pixels does not exceed the height of the pixels beside the transparent substrate material, to facilitate packaging.

It should be noted that a distance between every two adjacent pixels may be the same as or may be different from one another.

In one embodiment, the optical redirector is configured to refract the image displayed on the display panel into the eye of the user. The optical redirector includes a plurality of refraction structures. The plurality of refraction structures are in a one-to-one correspondence with the plurality of pixels. Each of the plurality of refraction structures is configured to refract, to a focus of the near-eye display, light emitted by a corresponding pixel. The focus of the near-eye display falls within an eyeball of the user.

Every two adjacent refraction structures in the plurality of refraction structures are disposed with a spacing therebetween, and a light-transmissive transparent substrate material is filled between every two adjacent refraction structures.

Specifically, the focus of the near-eye display falls on a central axis of a pupil center of the user.

In one embodiment, the spacing between every two adjacent refraction structures directly faces the spacing between every two adjacent pixels. In this way, the external real-view light can enter, without being blocked, the eye of the user through the transparent substrate materials filled in the spacings.

In this way, the refraction structure can refract, to the focus of the near-eye display, the light emitted by the pixel. In addition, the external real-view light can pass through the transparent substrate material and enter the eye of the user, so as to implement AR display by superimposing the virtual image displayed on the display panel and the real-view image.

In one embodiment, the transparent substrate material between every two adjacent refraction structures and the transparent substrate material between every two adjacent pixels are a same material.

In one embodiment, each refraction structure is bonded with a corresponding pixel by using first glue. Optionally, a pixel and a refraction structure are bonded with each other as a pixel component. To be specific, the near-eye display may include a plurality of pixel components that are disposed with a spacing therebetween, and a transparent substrate material is filled between every two adjacent pixel components.

In one embodiment, each pixel includes at least one light emitting unit, at least one bevel groove is disposed on a side that is of each refraction structure and that is close to the display panel, the at least one bevel groove is in a one-to-one correspondence with the at least one light emitting unit, and each of the at least one bevel groove is configured to refract, to the focus of the near-eye display, light emitted by a corresponding light emitting unit.

The bevel groove is disposed on the refraction structure, to refract, to the focus of the near-eye display, light emitted by each light emitting unit in the pixel.

In one embodiment, a line of intersection exists between a bevel of each of the at least one bevel groove and a side surface that is of the refraction structure and that is away from the display panel, and a first included angle Φ between the line of intersection and a first central axis in a horizontal direction of the near-eye display on the side surface that is of the refraction structure and that is away from the display panel meets the following formula:

$$\Phi = \arctan\left(\frac{L}{D}\right);$$

and a third included angle θ between the bevel of each bevel groove and the side surface that is of the refraction structure and that is away from the display panel meets the following formula:

$$\theta = \arg\cotan\left(\frac{n \times \cos\left(\arg\sin\left(\frac{\mu}{n}\right)\right) - n_f}{\mu}\right), \text{ where } \mu = \frac{\sqrt{D^2 + L^2}}{\sqrt{D^2 + L^2 + r^2}},$$

and

D is a distance from a central point of the bevel of each bevel groove to the first central axis, L is a distance from the central point of the bevel of each bevel groove to a second central axis in a direction perpendicular to the display panel on the side surface that is of the refraction structure and that is away from the display panel, n is a refractive index of a substrate material of the refraction structure, $n_f$ is a refractive index of the first glue, and r is a curvature radius of a near-eye display field-of-view arc surface.

A second included angle between the line of intersection and the first central axis is greater than or equal to the first included angle, and a fourth included angle between the bevel and the surface is greater than or equal to the third included angle.

The bevel groove disposed on the refraction structure meets the above requirements, so that the pixels in the display panel can be clearly visualized on an eye retina of the user in a form of a full field-of-view image, and the image is not blurred due to eye zoom of the user.

In one embodiment, the curvature radius r of the near-eye display field-of-view arc surface meets the following formula:

$$r = S + P \times \arg\tan\frac{\alpha}{2},$$

where

S is a distance from a center of the display panel to a pupil center of the user, α is a maximum visual angle of the eye, and P is a pupil radius of the user.

In one embodiment, the near-eye display further includes:

a collimation lens component that is disposed between the display panel and the optical redirector, where the collimation lens component is configured to: convert, into collimated light, light emitted by the plurality of pixels, and input the collimated light into the optical redirector; and the optical redirector is configured to refract, to the focus of the near-eye display, the collimated light input by the collimation lens component.

The collimation lens component is disposed, to improve imaging quality of the near-eye display.

In one embodiment, the collimation lens component includes a plurality of collimation lenses, the plurality of collimation lenses are in a one-to-one correspondence with the plurality of pixels, and each of the plurality of collimation lenses is configured to convert, into collimated light, light emitted by a corresponding pixel; and every two adjacent collimation lenses in the plurality of collimation lenses are disposed with a spacing therebetween, and a light-transmissive transparent substrate material is filled between every two adjacent collimation lenses.

In one embodiment, each of the plurality of pixels includes at least one light emitting unit, each collimation lens includes at least one collimation sub-lens, the at least one collimation sub-lens is in a one-to-one correspondence with the at least one light emitting unit, and each of the at least one collimation sub-lens is configured to convert, into collimated light, light emitted by a corresponding light emitting unit.

In one embodiment, the optical redirector includes a plurality of refraction structures, the plurality of refraction structures are in a one-to-one correspondence with the plurality of collimation lenses, each collimation lens is located between a corresponding pixel and a corresponding refraction structure, each collimation lens is bonded with the corresponding pixel by using second glue, and each collimation lens is bonded with the corresponding refraction structure by using third glue.

In one embodiment, a spacing between every two adjacent pixels, a spacing between corresponding adjacent collimation lenses, and a spacing between corresponding adjacent refraction structures directly face each other. In this way, the external real-view light can enter, without being blocked, the eye of the user through the transparent substrate materials filled in the spacings.

In one embodiment, a pixel, a collimation lens, and a refraction structure are bonded with each other as a pixel component. In this way, the near-eye display may include a plurality of pixel components that are disposed with a spacing therebetween, and a transparent substrate material is filled between every two adjacent pixel components.

In one embodiment, a refractive index of the second glue is the same as a refractive index of a substrate material of each collimation lens. In this way, the following case can be avoided: The second glue affects a focus of the collimation lens, and further affects a collimation effect.

In one embodiment, each pixel includes a red light emitting unit, a green light emitting unit, and a blue light emitting unit, and each collimation lens component includes three collimation sub-lenses, and a red light emitting unit, a green light emitting unit, and a blue light emitting unit in a same pixel are in a one-to-one correspondence with three collimation sub-lenses in a same collimation lens; and a minimum distance T from each of the red light emitting unit, the green light emitting unit, and the blue light emitting unit in the same pixel to each corresponding collimation sub-lens meets the following formula:

$$T = \frac{n_r}{n_r - n_{fr}} \times R_r = \frac{n_g}{n_g - n_{fg}} \times R_g = \frac{n_b}{n_b - n_{fb}} \times R_b,$$

where $R_r$, $R_g$, and $R_b$ are respectively curvature radiuses of the collimation sub-lenses respectively corresponding to the red light emitting unit, the green light emitting unit, and the blue light emitting unit in the same pixel, $n_r$, $n_g$, and $n_b$ are respectively refractive indexes of substrate materials of the collimation sub-lenses in red light, green light, and blue light, and $n_{fr}$, $n_{fg}$, and $n_{fb}$ are respectively refractive indexes of the third glue in the red light, the green light, and the blue light.

In one embodiment, a light shielding groove is disposed between two adjacent collimation sub-lenses in a same collimation lens, and the light shielding groove is filled with a light absorption material. In this way, mutual interference between light emitted by adjacent light emitting units can be avoided.

In one embodiment, light emitted by the plurality of pixels is collimated light. In this way, the optical redirector can refract as much light as possible to the focus of the near-eye display, and a structure of the near-eye display can be simplified because there is no need to additionally dispose a collimation lens component.

In one embodiment, the optical redirector includes a semi-reflective structure, configured to reflect a displayed image into the eye of the user, where a plane in which the plurality of pixels are located is located between the semi-reflective structure and a focal plane of the semi-reflective structure. Specifically, the semi-reflective structure reflects light emitted by the plurality of pixels, and the reflected light of the semi-reflective structure forms an upright magnified virtual image at a location at a specific distance from the eye of the user on a side that is of the semi-reflective structure and that is away from the plurality of pixels.

The semi-reflective structure is further configured to transmit the external real-view light without changing a path of the transmitted light. The semi-reflective structure does not cause a transmitted image to be distorted.

The semi-reflective structure can reflect the image displayed on the display panel into the eye of the user. In addition, the external real-view light can pass through the semi-reflective structure and the transparent substrate material between the adjacent pixels and enter the eye of the user, so as to implement AR display by superimposing the virtual image displayed on the display panel and the real-view image.

In one embodiment, a light shield layer is disposed below each pixel, and the light shield layer is configured to prevent light emitted by each pixel from directly entering the eye of the user. In this way, the following case can be avoided: The light emitted by the pixel directly enters the eye of the user and interferes with display.

In one embodiment, the semi-reflective structure is a Fresnel semi-reflective concave mirror, and the plane in which the plurality of pixels are located is located between the Fresnel semi-reflective concave mirror and a focal plane of the Fresnel semi-reflective concave mirror. In this way, reflected light of the Fresnel semi-reflective concave mirror can form a magnified virtual image at a location at a specific distance from the eye of the user on a side that is of the Fresnel semi-reflective concave mirror and that is away from the plurality of pixels.

The Fresnel semi-reflective concave mirror includes an internal semi-reflective semi-transmissive Fresnel coating.

The Fresnel semi-reflective concave mirror may perform near-collimation processing on light emitted by the display panel, so that an included angle between the light is quite small. Therefore, a point of intersection between the light can fall at a relatively far location, so that the display panel performs imaging at a distance from the eye of the user. In addition, partial light radiated to the Fresnel semi-reflective concave mirror can pass through the Fresnel semi-reflective concave mirror, and the Fresnel semi-reflective concave mirror does not change the path of the transmitted external real-view light. That is, the external real-view light is not distorted when passing through the Fresnel semi-reflective concave mirror. Then the transmitted external real-view light enters the eye of the user through the transparent substrate material between the pixels.

In one embodiment, a distance f from a focus of the Fresnel semi-reflective concave mirror to a center of the Fresnel semi-reflective concave mirror meets the following formula:

$$\frac{1}{u} + \frac{1}{d} = \frac{1}{f},$$

where d is a distance from the center of the Fresnel semi-reflective concave mirror to the plane in which the plurality of pixels are located, u is a specified distance from an imaging plane to the center of the Fresnel semi-reflective concave mirror, f and d are positive numbers, and u is a negative number. Herein, that u is a negative number indicates that a virtual image is formed on a back of the Fresnel semi-reflective concave mirror.

The distance f from the focus of the Fresnel semi-reflective concave mirror to the center of the Fresnel semi-reflective concave mirror meets the foregoing formula, so as to implement AR display by superimposing the image displayed on the near-eye display and the external real-view image.

In one embodiment, the optical redirector includes a plurality of triangular prism components, every two adjacent triangular prism components in the plurality of triangular prism components are isolated from each other, and a light-transmissive transparent substrate material is filled between every two adjacent triangular prism components. The plurality of triangular prism components are in a one-to-one correspondence with the plurality of pixels. Each triangular prism component is configured to: totally reflect light from a corresponding pixel, and refract the totally reflected light to a focus of the near-eye display. The focus of the near-eye display falls within an eyeball of the user. In other words, the focus of the near-eye display falls on a central axis of a pupil center of the user.

In one embodiment, a spacing between every two adjacent refraction structures directly faces the spacing between every two adjacent pixels. In this way, the external real-view light can enter, without being blocked, the eye of the user through transparent substrate materials filled in the spacings.

In this way, the triangular prism component can refract, to the focus of the near-eye display, the light emitted by the pixel. In addition, the external real-view light can pass through the transparent substrate material and enter the eye of the user, so as to implement AR display by superimposing the virtual image displayed on the display panel and the real-view image.

In one embodiment, the transparent substrate material between every two adjacent triangular prism components and the transparent substrate material between every two adjacent pixels are a same material.

In one embodiment, each triangular prism component is bonded with a corresponding pixel by using fourth glue. Optionally, a pixel and a triangular prism component are bonded with each other as a pixel component. To be specific, the near-eye display may include a plurality of pixel components that are disposed with a spacing therebetween, and a transparent substrate material is filled between every two adjacent pixel components.

In one embodiment, each of the plurality of pixels includes at least one light emitting unit. Each of the plurality of triangular prism components includes at least one triangular prism. The at least one triangular prism in the same triangular prism component is in a one-to-one correspondence with the at least one light emitting unit in the corresponding pixel.

Each of the at least one triangular prism includes an upper surface facing the display panel, a first upper prism edge and a second upper prism edge that are opposite to each other in the upper surface, a lower prism edge away from the upper surface, a first side surface, and a second side surface. The first upper prism edge and the lower prism edge are opposite to each other and are both located in the first side surface, the second upper prism edge and the lower prism edge are opposite to each other and are both located in the second side surface, and the lower prism edge is a line of intersection between the first side surface and the second side surface.

Light emitted by each of the at least one light emitting unit is input from an upper surface of a corresponding triangular prism, and is totally reflected at the second side surface, the reflected light is refracted at the first side surface, and the refracted light is output to the focus of the near-eye display.

In one embodiment, a minimum included angle between the lower prism edge of the triangular prism and an x-axis is ω, and ω meets:

$$\omega = \arg\tan\left(\frac{K}{F}\right).$$

The x-axis is a straight line, and the x-axis is parallel to a straight line on which a line between centers of two eyeballs of the user is located. A y-axis is perpendicular to the x-axis, and a plane in which the x-axis and the y-axis are located is a plane in which a surface that is of the display panel and that is away from the light emitting side is located. A straight line on which a line between a point of intersection between the x-axis and the y-axis and a center of a corresponding eyeball is located is perpendicular to the plane in which the surface that is of the display panel and that is away from the light emitting side is located, and the corresponding eyeball means an eyeball used to receive the refracted light.

A minimum included angle σ between the second side surface and the upper surface in the same triangular prism meets the following formula:

$$\sigma = \frac{1}{2}\arccos\left(-\frac{1}{m}\sin(\arctan(\eta))\right), \text{ where } \eta = \frac{r}{\sqrt{F^2 + K^2}},$$

and

F is a distance from a central point of the second side surface to the x-axis, K is a distance from a central point of the second side surface to the y-axis, m is a refractive index of a substrate material of the triangular prism, and r is a curvature radius of a near-eye display field-of-view arc surface.

In one embodiment, the curvature radius r of the near-eye display field-of-view arc surface meets the following formula:

$$r = S + P \times \arg\tan\frac{\alpha}{2},$$

where

S is a distance from a center of the display panel to a pupil center of the user, a is a maximum visual angle of the eye, and P is a pupil radius of the user.

In one embodiment, the near-eye display further includes a plurality of collimation lenses, the plurality of collimation lenses are in a one-to-one correspondence with the plurality of pixels, and each collimation lens is located between one pixel and a corresponding triangular prism component. Each collimation lens is configured to: convert, into collimated light, light emitted by a corresponding pixel, and output the collimated light to a corresponding triangular lens component.

Every two adjacent collimation lenses in the plurality of collimation lenses are disposed with a spacing therebetween, and a light-transmissive transparent substrate material is filled between every two adjacent collimation lenses. The plurality of collimation lenses are disposed to improve imaging quality of the near-eye display.

In one embodiment, each of the plurality of triangular prism components is bonded with a corresponding pixel by using fifth glue, and is bonded with a corresponding triangular prism component by using sixth glue.

In one embodiment, a spacing between every two adjacent pixels, a spacing between corresponding adjacent collimation lenses, and a spacing between corresponding adjacent refraction structures directly face each other. In this way, the external real-view light can enter, without being blocked, the eye of the user through the transparent substrate materials filled in the spacings.

In one embodiment, a pixel, a collimation lens, and a refraction structure are bonded with each other as a pixel component. In this way, the near-eye display may include a plurality of pixel components that are disposed with a spacing therebetween, and a transparent substrate material is filled between every two adjacent pixel components.

In one embodiment, a refractive index of the fifth glue is the same as a refractive index of a substrate material of each collimation lens. In this way, the following case can be avoided: The fifth glue affects a focus of the collimation lens, and further affects a collimation effect.

In one embodiment, the second glue and the fifth glue are same glue, or a refractive index of the second glue is the same as a refractive index of the fifth glue.

In one embodiment, each of the plurality of pixels includes at least one light emitting unit. Each collimation lens includes at least one collimation sub-lens. The at least one collimation sub-lens is in a one-to-one correspondence with the at least one light emitting unit. Each collimation sub-lens is configured to convert, into collimated light, light emitted by a corresponding light emitting unit.

In one embodiment, each pixel includes a red light emitting unit, a green light emitting unit, and a blue light emitting unit. Each collimation lens component includes three collimation sub-lenses. A red light emitting unit, a green light emitting unit, and a blue light emitting unit in a same pixel are in a one-to-one correspondence with three collimation sub-lenses in a same collimation lens.

A minimum distance T from each of the red light emitting unit, the green light emitting unit, and the blue light emitting unit in the same pixel to each corresponding collimation sub-lens meets the following formula:

$$T = \frac{n_r}{n_r - n_{fr}} \times R_r = \frac{n_g}{n_g - n_{fg}} \times R_g = \frac{n_b}{n_b - n_{fb}} \times R_b,$$

where $R_r$, $R_g$, and $R_b$ are respectively curvature radiuses of the collimation sub-lenses respectively corresponding to the red light emitting unit, the green light emitting unit, and the blue light emitting unit in the same pixel, $n_r$, $n_g$, and $n_b$ are respectively refractive indexes of substrate materials of the collimation sub-lenses in red light, green light, and blue light, and $n_{fr}$, $n_{fg}$, and $n_{fb}$ are respectively refractive indexes of the sixth glue in the red light, the green light, and the blue light.

In one embodiment, a light shielding groove is disposed between two adjacent collimation sub-lenses in a same collimation lens, and the light shielding groove is filled with a light absorption material.

According to a third aspect, a near-eye display system is provided, and the near-eye display system includes:

the near-eye display according to any aspect or any possible implementation of any aspect in the foregoing, a transceiver, a drive chip, and a battery, where the transceiver is configured to: receive an image signal, and transmit the image signal to the drive chip;

the drive chip is configured to drive, based on the image signal received by the transceiver, the near-eye display to display a corresponding image;

the near-eye display is configured to: display the image under the control of the drive chip, and project the displayed image into an eye of a user; and the battery is configured to supply power to the near-eye display system.

The near-eye display system in this embodiment of this application can not only implement AR display by superimposing a virtual image and a real-view image, but also can provide a relatively large field of view and improve visual experience of the user.

The image signal may be sent by a terminal or a server that is connected to the near-eye display (for example, connected in a wired or wireless manner).

In one embodiment, the image signal may be a digital image signal. The drive chip may convert the received digital image signal into a drive current strength and time sequence signal of a pixel in the near-eye display, and then drive the near-eye display based on the drive current strength and time sequence signal to display an image.

In a possible embodiment, the near-eye display system includes the near-eye display. When the user wears the near-eye display system, the near-eye display is corresponding to a left eye or a right eye of the user.

In a possible embodiment, the near-eye display system includes two near-eye displays. When the user wears the near-eye display system, one of the near-eye displays is corresponding to a left eye of the user, and the other one of the near-eye displays is corresponding to a right eye of the user.

In a possible embodiment, the transceiver is a wireless transceiver.

In a possible embodiment, the near-eye display system further includes an actuator, and the actuator is configured to: support the near-eye display, and adjust a position of the near-eye display based on a moving track of an eyeball of the user, so that a focus of the near-eye display falls within the eyeball of the user. In this way, when the eyeball of the user rolls, the user can view a clear image without manually adjusting the near-eye display, so as to improve use experience of the user.

It should be noted that, in the near-eye display with the semi-reflective structure such as the Fresnel semi-reflective concave mirror, a light cone formed by diverging light emitted by the pixels can cover an entire eyeball of the user. Regardless of how the eyeball rolls, the eyeball of the user can always receive the light emitted by the pixels, that is, the user can always view the image displayed on the near-eye display. Therefore, if the near-eye display in the near-eye display system is the near-eye display with the semi-reflective structure such as the Fresnel semi-reflective concave mirror, there is no need to dispose the actuator in the near-eye display system.

DESCRIPTION OF EMBODIMENTS

The following describes the technical solutions in the embodiments of this application with reference to the accompanying drawings.

Figure 1:
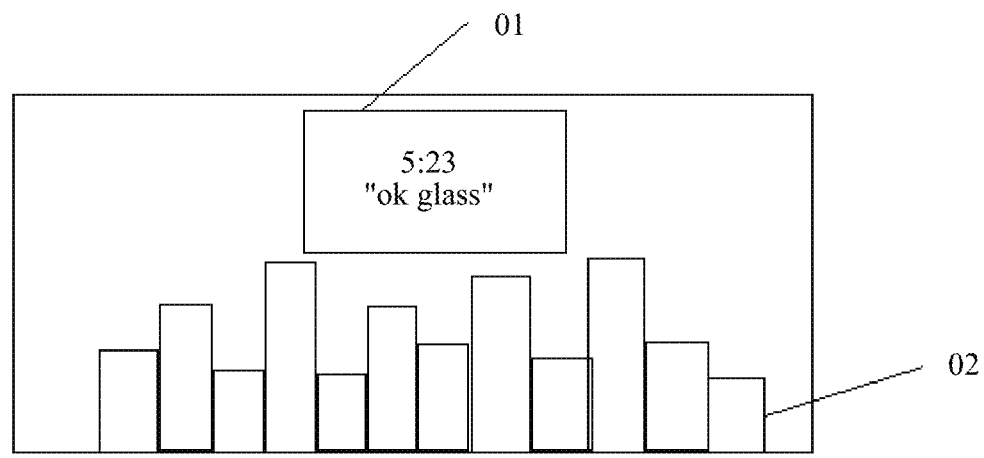
FIG. 1 is an effect drawing displayed by using an AR technology.
Figure 2:
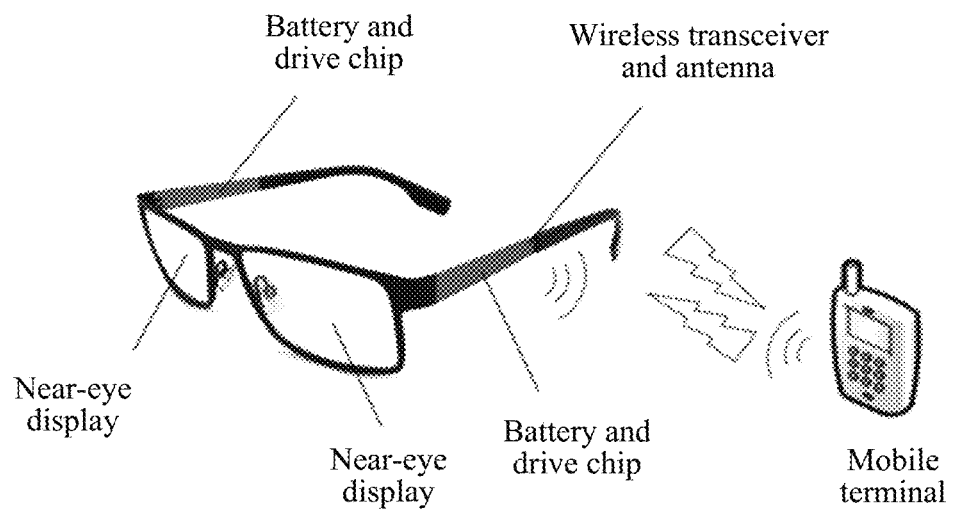
FIG. 2 is a schematic diagram of a near-eye display system according to an embodiment of this application.

FIG. 2 is a schematic diagram of a near-eye display system according to this application. As shown in FIG. 2, the near-eye display system includes a near-eye display, a drive chip, a battery, a transceiver, and an antenna.

The near-eye display is configured to project an image into an eye of a user. The drive chip is configured to: convert a digital image signal into a drive current strength and time sequence signal of a pixel, connect to the near-eye display by using a metallic wire hidden in a frame, and drive the near-eye display to display an image. The battery supplies power to the entire near-eye display system. The transceiver and the antenna are configured to: receive, from a mobile terminal, the digital image signal transmitted by using a wireless link, and transmit the digital image signal to the drive chip. In one embodiment, the transceiver may be specifically a wireless transceiver.

As shown in FIG. 2, the near-eye display system may include two near-eye displays: a left near-eye display and a right near-eye display. The two near-eye displays are respectively corresponding to a left eye and a right eye of the user, so that both eyes of the user can view an augmented real-view image by using an AR display technology. However, this is not limited in this application. The near-eye display system may alternatively include only one near-eye display. The near-eye display corresponds to a left eye or a right eye of the user, so that the eye of the user that is corresponding to the near-eye display can view an augmented real-view image by using an AR display technology.

In other words, the near-eye display in this application may be considered as a lens in the near-eye display system.

Figure 3:
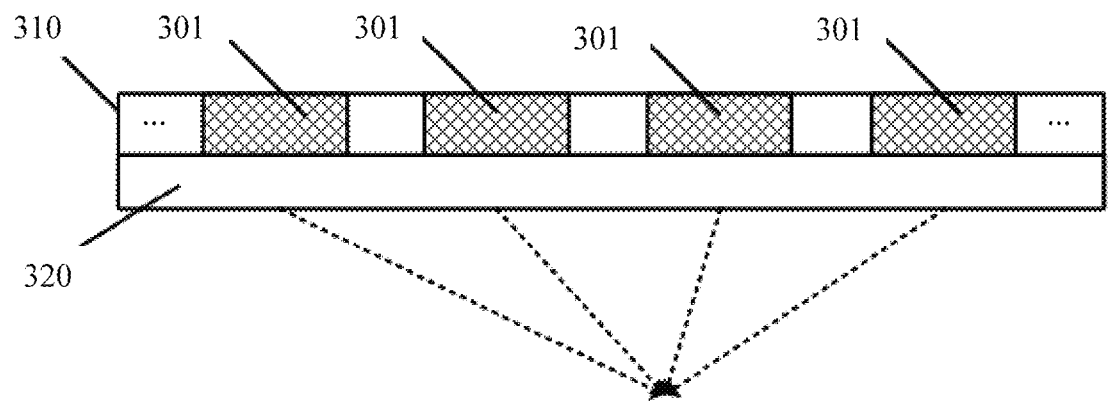
FIG. 3 is a side view of a near-eye display according to an embodiment of this application.

As shown in FIG. 3, a near-eye display provided in this application may include a display panel 310 and an optical redirector 320. The display panel 310 includes a plurality of pixels 301. Every two adjacent pixels 301 in the plurality of pixels 301 are disposed with a spacing therebetween. A light-transmissive transparent substrate material is filled between every two adjacent pixels 301. The plurality of pixels 301 are disposed in the display panel 310 in a tiling manner. This specifically indicates that the plurality of pixels 301 do not overlap with each other in a direction perpendicular to the display panel 310, and each pixel 301 does not block, in the direction perpendicular to the display panel 310, light emitted by another pixel 301.

It should be noted that a difference between the display panel 310 in this application and a display panel in the prior art is that every two adjacent pixels 301 are disposed with a preset distance therebetween, and the light-transmissive transparent substrate material is filled between every two adjacent pixels 301. In this design, external real-view light can pass through the transparent substrate material between adjacent pixels and enter an eye of a user.

The optical redirector 320 is disposed on a light emitting side of the display panel 310, and is configured to reflect or refract (that is, converge) an image displayed on the display panel 310 into the eye of the user.

In some embodiments, the optical redirector 320 is configured to converge the image displayed on the display panel 310 into the eye of the user. Specifically, the optical redirector 320 is configured to converge, on a focus of the near-eye display, light emitted by the pixels 301 in the display panel 310. Specifically, the light emitted by the pixels 310 forms a light beam, and a center of the light beam is directed to the focus of the near-eye display after the light beam is reflected or refracted by the optical redirector 320.

It should be noted that the focus of the near-eye display is a point at which collimated light passing through the near-eye display is converged. This point is the focus of the near-eye display. The collimated light is relative to diverging light. Generally, light is divergent. To be specific, two rays of light that are originally adjacent to each other become increasingly distant from each other as the two rays of light spread. After light is emitted from a light source, if a divergence angle of the emitted light is less than or equal to a specified angle (for example, in this application, the specified angle may be less than or equal to 5°), it may be considered that a plurality of rays of light emitted by the light source are parallel to each other and are collimated light. The collimated light generally means that a plurality of rays of light are approximately parallel to each other.

In this application, the near-eye display includes the display panel and the optical redirector. Therefore, in this application, light emitted by the display panel is converged on the focus of the near-eye display after the light passes through the optical redirector.

In addition, a person skilled in the art learns that to enable the user to more clearly view the image displayed on the near-eye display, optionally, the focus of the near-eye display falls within an eyeball of the user (it may be understood that the focus falls within the eyeball of the user when the user normally wears the near-eye display). Specifically, the focus of the near-eye display falls on a central axis of a pupil center of the user. In this embodiment and other embodiments, unless otherwise stated, the focus of the near-eye display falls on the central axis of the pupil center of the user. It should be further noted that, after the user wears the near-eye display, if the eyeball of the user rolls, the focus of the near-eye display may not fall on the central axis of the pupil center of the user. In this case, a component (for example, an actuator) configured to support the near-eye display may automatically track the eye rolling of the user, and automatically adjust a position of the near-eye display, so that the focus of the near-eye display falls on the central axis of the pupil center of the user. In this way, when the eyeball of the user rolls, the user can view a clear image without manually adjusting the near-eye display, so as to improve use experience of the user.

A supporting component such as an actuator may adjust the position of the near-eye display with reference to a head shape, a facial shape, or the like, so as to more accurately adjust the position of the near-eye display.

In one embodiment, a substrate material of the optical redirector 320 may be a transparent substrate material.

In one embodiment, the display panel 310 may further include a transparent substrate, and the plurality of pixels 301 may be disposed with a spacing therebetween on the transparent substrate of the display panel 310.

The plurality of pixels are disposed in the display panel, and the transparent substrate material is used to fill a spacing between any two adjacent pixels, so that the external real-view light can pass through the spacing between any two pixels to superimpose an external real-view image and an image displayed by the pixels.

The transparent substrate material in this application may be glass or transparent resin. However, this is not limited in this application. The transparent substrate material may be another light-transmissive material. It should be noted that light transmittance of the transparent substrate material is not limited either in this application. For example, the light transmittance of the transparent substrate material may be 80% to 95%. Higher light transmittance of the transparent substrate material indicates higher quality of an image that people can view when wearing the near-eye display. Optionally, the spacing between any two adjacent pixels is filled with the transparent substrate material, to increase the light transmittance as much as possible.

In some embodiments, the plurality of pixels 301 may be disposed in a form of an M×N matrix, and M and N are both integers greater than or equal to 1. However, this is not limited in this application. The plurality of pixels 301 may be disposed in another regular form or an irregular form.

Adjacent pixels may be adjacent pixels in one or more specified directions, and the specified direction may be determined according to an arrangement form of the pixels. For example, if the plurality of pixels 301 are disposed in the form of a matrix, adjacent pixels are adjacent pixels in a row direction and/or a column direction.

It should be understood that, that every two adjacent pixels are disposed with a spacing therebetween indicates that a specific spacing distance is set between the two disposed adjacent pixels. The spacing distance may be adjusted based on an actual product. A longer spacing distance indicates higher light transmittance and lower image quality. A shorter spacing distance indicates lower light transmittance and higher image quality.

In some embodiments, a spacing distance between every two adjacent pixels is the same as one another, so that a process of manufacturing the near-eye display can be simplified. However, this is not limited in this application. A spacing distance between every two adjacent pixels may be different from one another, or spacing distances between some adjacent pixels are the same. For example, if the plurality of pixels 301 are disposed in the form of a matrix, a spacing distance between two adjacent pixels is the same as one another in a row direction and/or a column direction; or a spacing between two adjacent pixels in a row direction is a first distance, a spacing between two adjacent pixels in a column direction is a second distance, and the first distance is different from the second distance.

In the near-eye display in this application, the optical redirector is disposed on the light emitting side of the display panel, to reflect or refract the image displayed on the display panel into the eye of the user. In addition, the external real-view light passes through the transparent substrate material between the pixels and enters the eye of the user, so as to implement AR display by superimposing a virtual image displayed on the display panel and the external real-view image. In addition, the pixels are arranged on the entire display panel, so as to provide a relatively large field of view and improve visual experience of the user.

In addition, the near-eye display in this application does not have a complex optical lens group or an electromechanical moving part. Therefore, weight of the near-eye display is reduced.

The optical redirector in this application may be any structure that can refract, to the focus of the near-eye display, the light emitted by the pixel. A specific implementation form of the optical redirector is not limited in this application.

In this embodiment of this application, the near-eye display may include the display panel, and a collimation lens component and the optical redirector that are successively disposed on the light emitting side of the display panel.

The display panel may include the plurality of pixels that are disposed in a tiling manner. Every two adjacent pixels in the plurality of pixels are disposed with a spacing therebetween. The light-transmissive transparent substrate material is filled between every two adjacent pixels.

The collimation lens component may include a plurality of collimation lenses. The plurality of collimation lenses are in a one-to-one correspondence with the plurality of pixels. Each of the plurality of collimation lenses is configured to: convert, into collimated light, light emitted by a corresponding pixel, and input the collimated light into the optical redirector. Every two adjacent collimation lenses in the plurality of collimation lenses are disposed with a spacing therebetween. A light-transmissive transparent substrate material is filled between every two adjacent collimation lenses.

The optical redirector may include a plurality of light convergence structures. The plurality of light convergence structures are in a one-to-one correspondence with the plurality of collimation lenses. Each of the plurality of light convergence structures is configured to converge, on the focus of the near-eye display, collimated light input by a corresponding collimation lens. The focus of the near-eye display falls within the eyeball of the user. Every two adjacent light convergence structures in the plurality of light convergence structures are disposed with a spacing therebetween. A light-transmissive transparent substrate material is filled between every two adjacent light convergence structures.

For details, refer to the foregoing description of the display panel. To avoid repetition, details are not described herein again.

Figure 4:
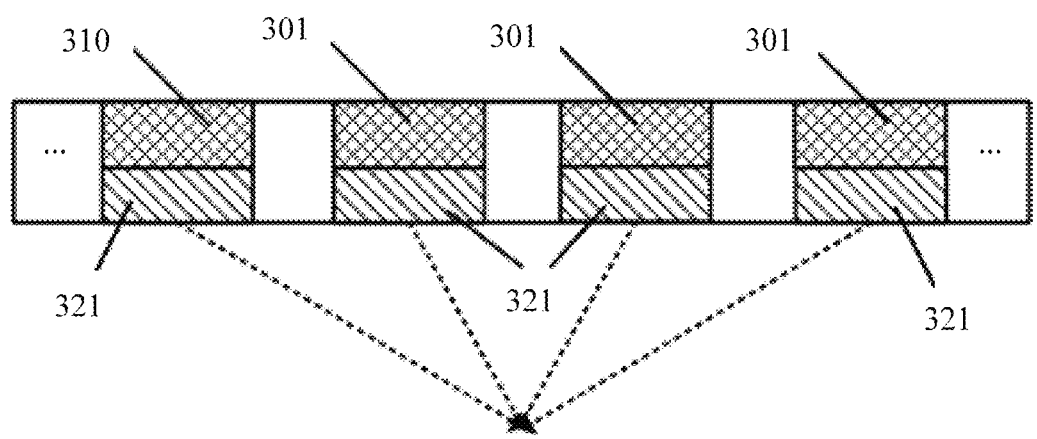
FIG. 4 is a side view of a near-eye display according to another embodiment of this application.

In an embodiment of this application, as shown in FIG. 4, the optical redirector 320 includes the plurality of light convergence structures. The light convergence structures may be specifically refraction structures 321. The plurality of refraction structures 321 are in a one-to-one correspondence with the plurality of pixels 301. Each refraction structure 321 is configured to refract, to the focus of the near-eye display, light emitted by a corresponding pixel 301. A light-transmissive transparent substrate material is filled between every two adjacent refraction structures 321. The transparent substrate material can enable the external real-view light to pass through. Optionally, the transparent substrate material filled between adjacent refraction structures 321 is the same as the transparent substrate material filled between adjacent pixels 301.

In one embodiment, each refraction structure 321 is bonded with a corresponding pixel 301 by using glue.

In one embodiment, a side surface that is of each refraction structure 321 and that is close to the corresponding pixel 301 is greater than or equal to a light emitting surface of the corresponding pixel 301. In this way, more light emitted by each pixel 301 can enter a corresponding refraction structure 321, so that each refraction structure 321 can refract more light to the focus of the near-eye display.

In one embodiment, a distance between every two adjacent refraction structures 321 is the same as a distance between two adjacent pixels 301 corresponding to the two adjacent refraction structures 321.

In some embodiments, each pixel 301 and a corresponding refraction structure 321 may be bonded with each other as a pixel component by using glue. To be specific, the near-eye display may include a plurality of pixel components that are disposed with a spacing therebetween, and a light-transmissive transparent substrate material is filled between every two adjacent pixel components. The external real-view light can pass through the transparent substrate material and enter the eye of the user.

In some embodiments, the pixel 301 is a monochrome pixel. For example, each pixel 301 includes a light emitting unit of one color, such as a red light emitting unit, a green light emitting unit, or a blue light emitting unit.

In one embodiment, each of the plurality of pixels includes at least one light emitting unit. A collimation lens corresponding to each pixel includes at least one collimation sub-lens that is in a one-to-one correspondence with the at least one light emitting unit. Each collimation sub-lens converts, into collimated light, light emitted by a light emitting unit corresponding to each collimation sub-lens.

Figure 5:
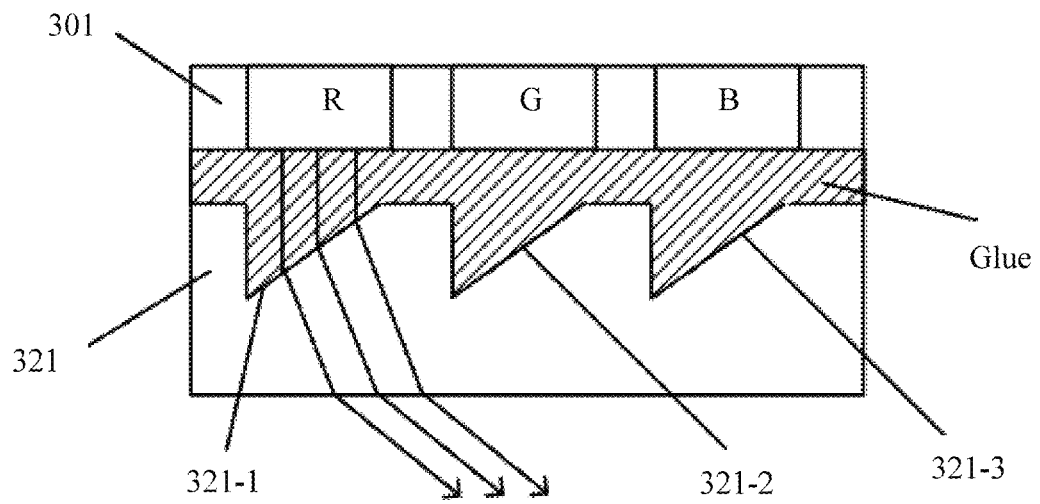
FIG. 5 is a side view of a near-eye display according to another embodiment of this application.

In some embodiments, the pixel 301 is a three-primary-color pixel. For example, as shown in FIG. 5, each pixel 301 includes a red (R) light emitting unit, a green (G) light emitting unit, and a blue (B) light emitting unit.

In one embodiment, a light convergence structure corresponding to each collimation lens includes a light convergence sub-structure that is in a one-to-one correspondence with the at least one collimation sub-lens, and each light convergence sub-structure converges, on the focus of the near-eye display, collimated light emitted by a collimation sub-lens corresponding to each light convergence sub-structure.

In an embodiment, when the light convergence structure is a refraction structure, the light convergence sub-structure is also a refraction structure. The refraction structure includes a first refraction surface. The first refraction surface refracts, to the focus of the near-eye display, collimated light emitted by a collimation sub-lens corresponding to the refraction structure.

In addition, according to one embodiment, the first refraction surface may be a first refraction plane. The first refraction plane is located on a side that is of the refraction structure and that is close to the display panel. A line of intersection exists between a plane in which the refraction plane is located and a plane in which a second refraction plane that is of the refraction structure and that is away from the display panel is located. A minimum included angle between the line of intersection and an x-axis is Φ. The x-axis is a straight line, and the x-axis is parallel to a straight line on which a line between centers of two eyeballs of the user is located. Φ meets the following formula:

$$\Phi = \arctan\left(\frac{L}{D}\right)$$

A minimum included angle θ between a plane in which each first refraction plane is located and the plane in which the second refraction plane of the refraction structure is located meets the following formula:

$$\theta = \arg\cotan\left(\frac{n \times \cos\left(\arg\,\sin\left(\frac{\mu}{n}\right)\right) - n_f}{\mu}\right),$$

$$\text{where } \mu = \frac{\sqrt{D^2 + L^2}}{\sqrt{D^2 + L^2 + r^2}},$$

and

D is a distance from a central point of each first refraction plane to the x-axis, L is a distance from the central point of each first refraction plane to a y-axis, n is a refractive index of a substrate material of the refraction structure, $n_f$ is a refractive index of a filling material between the refraction structure and a corresponding collimation sub-structure, r is a curvature radius of a near-eye display field-of-view arc surface, the y-axis is perpendicular to the x-axis, a plane in which the x-axis and the y-axis are located is a plane in which a surface that is of the display panel and that is away from the light emitting side is located, a straight line on which a line between a point of intersection between the x-axis and the y-axis and a center of a corresponding eyeball is located is perpendicular to the plane in which the x-axis and the y-axis are located, and the corresponding eyeball means an eyeball used to receive the refracted light.

In some embodiments, the light convergence sub-structure (that is, the refraction structure) may be specifically a bevel groove. Specifically, a bevel of the bevel groove is the foregoing first refraction plane, and the side surface that is of the refraction structure and that is away from the display panel is the second refraction plane.

In one embodiment, as shown in FIG. 5, three bevel grooves 321-1 to 321-3 are disposed on a side that is of each refraction structure 321 and that is close to the display panel 310. The three bevel grooves 321-1 to 321-3 in each refraction structure 321 are in a one-to-one correspondence with the three light emitting units in each pixel 301. Each bevel groove is configured to refract, to the focus of the near-eye display, light emitted by a corresponding light emitting unit. A filling material between the refraction structure and a corresponding collimation sub-structure is, for example, the glue used to bond each pixel 301 and a corresponding refraction structure 321, as shown in a shadow area in FIG. 5.

It should be noted that, in FIG. 5, a case in which the light emitted by each light emitting unit in the pixel is collimated light is used only as an example. The light emitted by each light emitting unit in the pixel may be diverging light. This is not limited in this embodiment of this application. It should be further noted that, in FIG. 5, three rays of light emitted by the R light emitting unit are used as only an example for description. A beam including a plurality of rays of light emitted by each light emitting unit is refracted by a same bevel groove, and directed to the focus of the near-eye display. Specifically, the beam including the plurality of rays of light emitted by each light emitting unit is refracted by the bevel groove, and a center of the refracted beam is directed to the focus of the near-eye display. A size of a cross-section of the beam emitted by the light emitting unit is related to a size of the light emitting unit.

When the pixel 301 in the display panel is a three-primary-color pixel, the pixel 301 can emit light of different colors, so that the display panel can implement color display. Therefore, the near-eye display can display a color image.

The light emitting unit in this application may be a light-emitting diode (LED) or an organic light-emitting diode (OLED). By using an LED/OLED display technology, costs of the near-eye display in this application are less than those of a near-eye display in the prior art.

Figure 6:
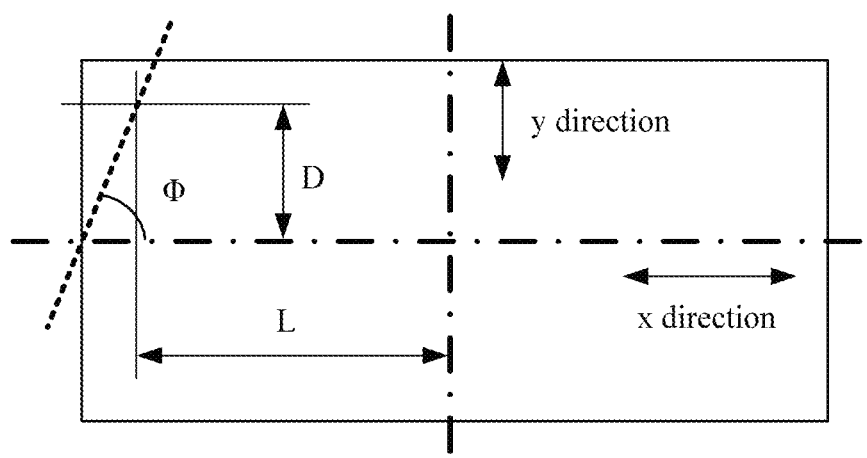
FIG. 6 is a schematic diagram of parameters of a refraction structure according to another embodiment of this application.

In order that each refraction structure can more accurately refract, to the focus of the near-eye display, the light emitted by each pixel, a design of each bevel groove in each refraction structure 321 may meet the following requirements:

1. A line of intersection exists between the bevel of each bevel groove and the side surface that is of the refraction structure 321 and that is away from the display panel 310. A first included angle Φ (as shown in FIG. 6) between the line of intersection and a first central axis in a horizontal direction (for example, an x direction) of the near-eye display on the side surface that is of the refraction structure 321 and that is away from the display panel 310 meets the following formula (1):

$$\Phi = \arctan\left(\frac{L}{D}\right) \quad (1)$$

A second included angle between the line of intersection and the first central axis is greater than or equal to the first included angle, that is, the first included angle is a smaller included angle in the two included angles between the line of intersection and the first central axis.

Figure 7:
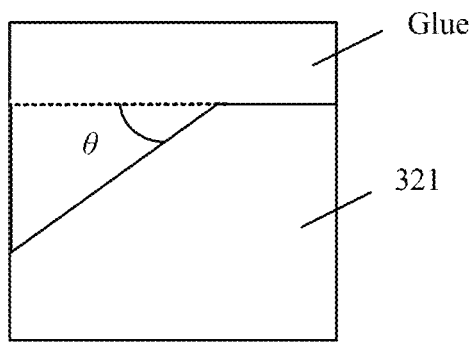
FIG. 7 is a side view of a refraction structure according to another embodiment of this application.

2. A third included angle θ (as shown in FIG. 7) between the bevel of each bevel groove and the side surface that is of the refraction structure 321 and that is away from the display panel 310 meets the following formula (2):

$$\theta = \text{argcotan}\left(\frac{n \times \cos\left(\arcsin\left(\frac{\mu}{n}\right)\right) - n_f}{\mu}\right), \text{ where} \quad (2)$$

$$\mu = \frac{\sqrt{D^2 + L^2}}{\sqrt{D^2 + L^2 + r^2}}.$$

A fourth included angle between the bevel of each bevel groove and the side surface that is of the refraction structure 321 and that is away from the display panel 310 is greater than or equal to the third included angle, that is, the third included angle is a smaller included angle in the two included angles between the bevel of each bevel groove and the side surface that is of the refraction structure 321 and that is away from the display panel 310.

Meanings of the parameters in the formula (1) and the formula (2) are as follows:

D is a distance from a central point of the bevel of each bevel groove to the first central axis, L is a distance from the central point of the bevel of each bevel grove to a second central axis in a vertical direction (for example, a y direction) of the near-eye display on the side surface that is of the refraction structure 321 and that is away from the display panel 310, n is a refractive index of the substrate material of the refraction structure 321, $n_f$ is a refractive index of the glue between the refraction structure 321 and the corresponding pixel 301, and r is a curvature radius of a near-eye display field-of-view arc surface.

In some embodiments, the curvature radius r of the near-eye display field-of-view arc surface meets the following formula:

$$r = S + P \times \arctan\frac{\alpha}{2}$$

Figure 8:
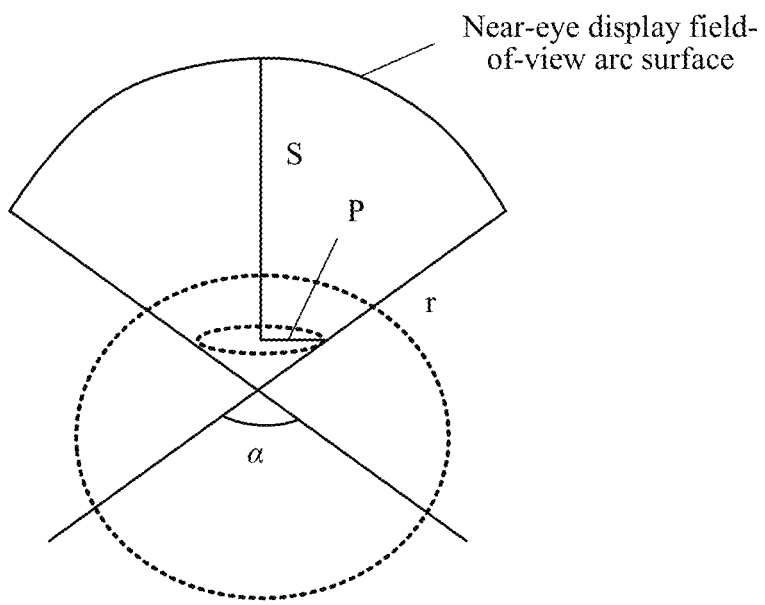
FIG. 8 is a schematic diagram of a near-eye display field-of-view arc surface.

As shown in FIG. 8, S is a distance from a center of the display panel to a pupil center of the user, a is a maximum visual angle of the eye, and P is a pupil radius of the user.

A center of sphere of the near-eye display field-of-view arc surface is a focus of the refraction structure of the near-eye display.

By using the refraction structure that meets the foregoing design, the display panel can perform clearer imaging on a retina of the user, and an image is not blurred due to eye zoom of the user. It should be noted that, examples of the foregoing described formula (1) and formula (2) are intended to help a person skilled in the art better understand the embodiments of this application, instead of limiting the scope of the embodiments of this application. A person skilled in the art certainly can make various equivalent modifications or changes based on the provided examples of the formula (1) and the formula (2), and such modifications or changes also fall within the scope of the embodiments of this application.

In some embodiments, in order that as much light as possible emitted by the pixel is input into the refraction structure, and the refraction structure refracts as much light as possible to the focus of the near-eye display, the light emitted by the pixel may be collimated light (that is, parallel light). For example, an LED pixel that can emit collimated light may be used. As shown in FIG. 5, light emitted by each light emitting unit in the pixel is collimated light. Alternatively, a collimation lens may be used to perform collimation processing on diverging light emitted by the pixel.

Figure 9:
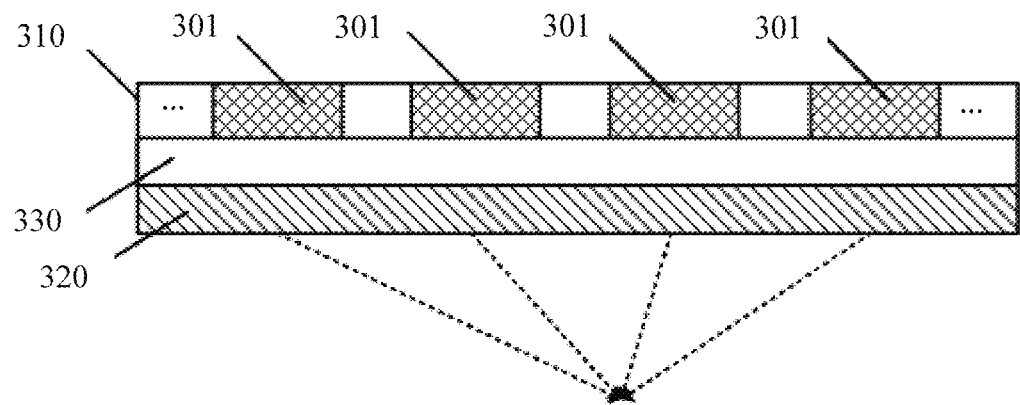
FIG. 9 is a side view of a near-eye display according to another embodiment of this application.

In some embodiments, as shown in FIG. 9, the near-eye display further includes a collimation lens component 330 that is disposed between the display panel 310 and the optical redirector 320, and the collimation lens component is configured to: convert, into collimated light, light emitted by the plurality of pixels 301, and input the collimated light into the optical redirector 320. Correspondingly, the optical redirector 320 is configured to refract, to the focus of the near-eye display, the collimated light input by the collimation lens component 330.

Figure 10:
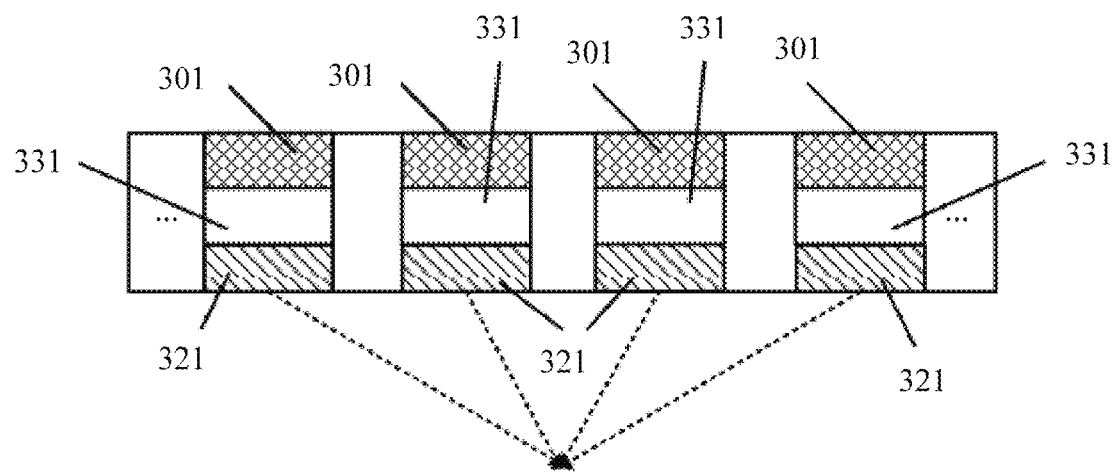
FIG. 10 is a side view of a near-eye display according to another embodiment of this application.

In some embodiments, as shown in FIG. 10, the collimation lens component 330 includes a plurality of collimation lenses 331. The plurality of collimation lenses 331 are in a one-to-one correspondence with the plurality of pixels 301. Each collimation lens 331 is configured to convert, into collimated light, light emitted by a corresponding pixel 301. Every two adjacent collimation lenses 331 are disposed with a spacing therebetween. A light-transmissive transparent substrate material is filled between every two adjacent collimation lenses 331. Optionally, the transparent substrate material filled between adjacent collimation lenses 331 is the same as the transparent substrate material filled between adjacent pixels 301.

In one embodiment, as shown in FIG. 10, the optical redirector 320 includes a plurality of refraction structures 321. The plurality of refraction structures 321 correspond to the plurality of collimation lenses 331. Each collimation lens 331 is located between a corresponding pixel 301 and a corresponding refraction structure. Each pixel 301 may be bonded with a corresponding collimation lens 331 by using glue 1, and each collimation lens 331 may be bonded with a corresponding refraction structure 321 by using glue 2. In this embodiment of this application, a design of each bevel groove in the refraction structure 321 also meets the foregoing design of the formula (1) and the formula (2). It should be noted that $n_f$ in the formula (2) is a refractive index of the glue 2 between the refraction structure 321 and the corresponding collimation lens 331.

In one embodiment, a refractive index of the glue 1 is the same as a refractive index of a substrate material of the collimation lens 331. In this way, the following case can be avoided: The glue 1 affects a focus of the collimation lens 331, and further affects a collimation effect. Optionally, the refractive index of the glue 1, the refractive index of the substrate material of the collimation lens 331, and the refractive index of the substrate material of the refraction structure 321 are the same.

In one embodiment, a distance between every two adjacent collimation lenses 331 is the same as a distance between two adjacent pixels 301 corresponding to the two adjacent collimation lenses 331.

In some embodiments, each pixel 301, the collimation lens 331 corresponding to the pixel 301, and the refraction structure 321 corresponding to the pixel 301 may be used as a pixel component. To be specific, the near-eye display may include a plurality of pixel components, every two adjacent pixel components in the plurality of pixel components are disposed with a spacing therebetween, and a light-transmissive transparent substrate material is filled between every two adjacent pixel components. The external real-view light can pass through the transparent substrate material and enter the eye of the user.

Figure 11:
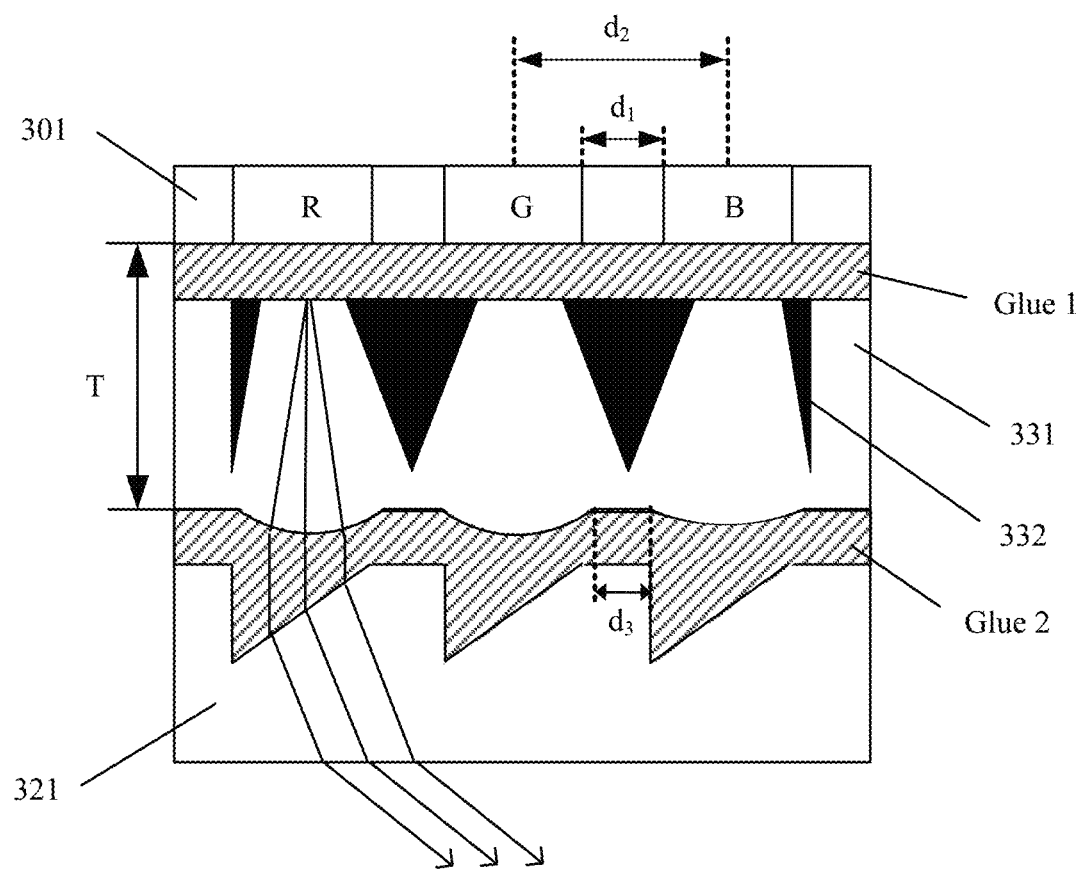
FIG. 11 is a side view of a near-eye display according to another embodiment of this application.

In some embodiments, as shown in FIG. 11, each collimation lens 331 may further include at least one collimation sub-lens, each pixel 301 includes at least one light emitting unit, and the at least one collimation sub-lens is in a one-to-one correspondence with the at least one light emitting unit. Each collimation sub-lens is configured to convert, into collimated light, light emitted by a corresponding light emitting unit.

In some embodiments, each pixel 301 includes a red (R) light emitting unit, a green (G) light emitting unit, and a blue (B) light emitting unit, each collimation lens 331 includes three collimation sub-lenses, and an R light emitting unit, a G light emitting unit, and a B light emitting unit in a same pixel are in a one-to-one correspondence with three collimation sub-lenses in a same collimation lens.

Correspondingly, a minimum distance T from each of the R light emitting unit, the G light emitting unit, and the B light emitting unit in the same pixel to each corresponding collimation sub-lens meets the following formula:

$$T = \frac{n_r}{n_r - n_{fr}} \times R_r = \frac{n_g}{n_g - n_{fg}} \times R_g = \frac{n_b}{n_b - n_{fb}} \times R_b,$$

where $R_r$, $R_g$, and $R_b$ are respectively curvature radiuses of the collimation sub-lenses respectively corresponding to the R light emitting unit, the G light emitting unit, and the B light emitting unit in the same pixel, $n_r$, $n_g$, and $n_b$ are respectively refractive indexes of substrate materials of the collimation sub-lenses in red light, green light, and blue light, and $n_{fr}$, $n_{fg}$, and $n_{fb}$ are respectively refractive indexes of filling materials (that is, the glue 2) between the collimation sub-lenses and corresponding light convergence structures in the R light, the G light, and the B light.

It should be noted that, in FIG. 11, three rays of light emitted by the R light emitting unit are used only as an example for description. A plurality of rays of diverging light emitted by each light emitting unit are converted into a plurality of rays of collimated light by using an auto-collimation lens. A beam including the plurality of rays of collimated light is refracted by a same bevel groove, and directed to the focus of the near-eye display. Specifically, the beam including the plurality of rays of light emitted by each light emitting unit is refracted by the bevel groove, and a center of the refracted beam is directed to the focus of the near-eye display.

In one embodiment, as shown in FIG. 11, a light shielding groove 332 may be further disposed between two adjacent collimation sub-lenses in a same collimation lens, and the light shielding groove 332 is filled with a light absorption material. In this way, mutual interference between light emitted by adjacent light emitting units can be avoided.

Figure 12:
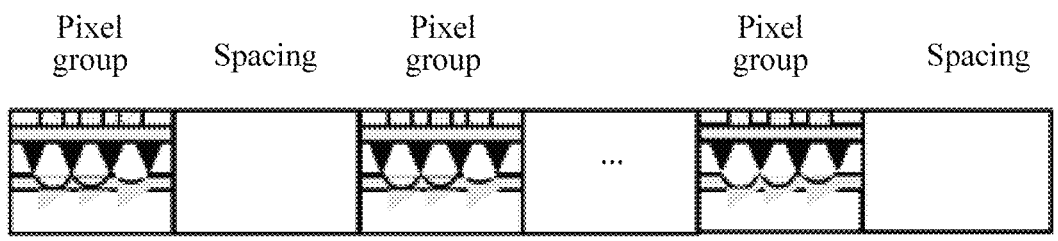
FIG. 12 is a side view of a near-eye display according to another embodiment of this application.

In some embodiments, a pixel 301, a corresponding collimation lens 331, and a corresponding refraction structure 321 shown in FIG. 11 may be used as a pixel component. As shown in FIG. 12, the near-eye display may include a plurality of pixel components, every two adjacent pixel components in the plurality of pixel components are disposed with a spacing therebetween, and a light-transmissive transparent substrate material is filled between every two adjacent pixel components.

Figure 13:
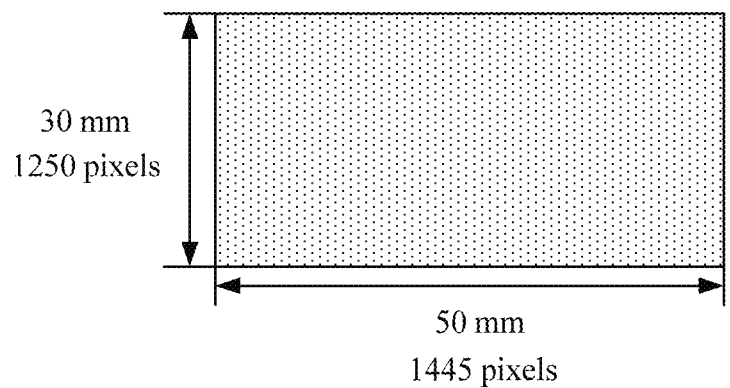
FIG. 13 is a schematic diagram of a size of a near-eye display according to another embodiment of this application.

The following describes parameters of a near-eye display according to the embodiments of this application by using a specific example. As shown in FIG. 13, a size of a display panel of the near-eye display may be: 50 mm×30 mm, and a quantity of pixels is 1445 pixels (pixel)×1250 pixels. A diameter of a light emitting unit is 5 μm, a spacing $d_1$ between two adjacent light emitting units is 5 μm, a distance $d_2$ between centers of two adjacent light emitting units is 10 μm, a distance $d_3$ between two adjacent collimation sub-lenses is 2 μm, a diameter $R_r$ of a red light emitting unit is 8 μm, a diameter Rg of a green light emitting unit is 8.5 μm, a diameter Rb of a blue light emitting unit is 9 μm, a minimum distance T from a collimation sub-lens to a light emitting unit is 36 μm, a refractive index of glue 1, a refractive index of a substrate material of a collimation lens 331, and a refractive index of a substrate material of a refraction structure 321 are all 1.7, a refractive index of glue 2 is 1.45, and a thickness of the near-eye display may be 200 μm or 1 mm. A greater thickness of the near-eye display indicates higher rigidity. It should be understood that this example is merely intended to help a person skilled in the art better understand the embodiments of this application, instead of limiting the scope of the embodiments of this application. A person skilled in the art certainly can make various equivalent modifications or changes based on the foregoing example, and such modifications or changes also fall within the scope of the embodiments of this application.

In an embodiment of this application, the optical redirector includes a plurality of light convergence structures. The light convergence structures may be specifically reflection structures. When the light convergence structure is a reflection structure, the light direction sub-structure is also a reflection structure. The reflection structure includes a first reflection surface. The first reflection surface reflects, to the focus of the near-eye display, collimated light emitted by a collimation sub-lens corresponding to the reflection structure.

In addition, according to one embodiment, the first reflection surface is a first reflection plane, the reflection structure further includes a third refraction plane, the first reflection plane totally reflects the collimated light emitted by the collimation sub-lens corresponding to the reflection structure, the totally reflected light is refracted at the third refraction plane, and the refracted light is output to the focus of the near-eye display.

In one embodiment, the reflection structure may be a triangular prism, and the triangular prism includes an upper surface facing the display panel, a first upper prism edge and a second upper prism edge that are opposite to each other in the upper surface, a lower prism edge away from the upper surface, the first reflection plane, and the third refraction plane. The first upper prism edge and the lower prism edge are opposite to each other and are both located in the third refraction plane. The second upper prism edge and the lower prism edge are opposite to each other and are both located in the first reflection plane. The lower prism edge is a line of intersection between the third refraction plane and the first reflection plane. Herein, the first reflection plane may also be referred to as a first side surface, and the third refraction plane may also be referred to as a second side surface.

Light emitted by each of the at least one light emitting unit is input from an upper surface of a corresponding triangular prism, and is totally reflected at the first reflection plane. The totally reflected light is refracted at the third refraction plane. The refracted light is output to the focus of the near-eye display.

Figure 20:
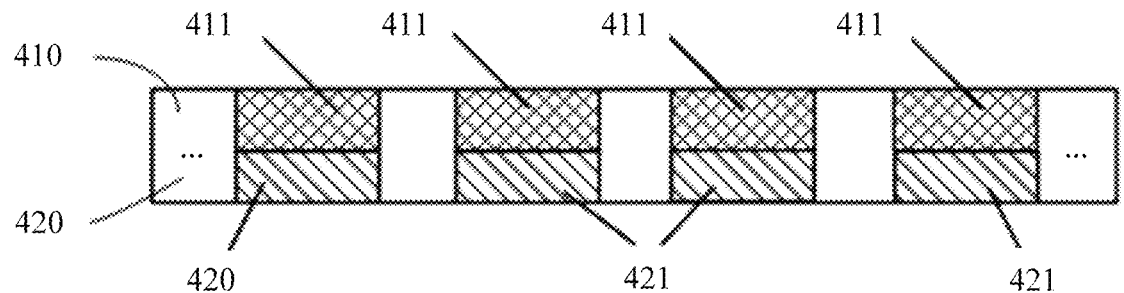
FIG. 20 is a side view of another near-eye display according to this application.

Referring to FIG. 20, FIG. 20 is a side view of another near-eye display according to this application. In the near-eye display shown in FIG. 20, a display panel 410 includes a plurality of pixels 411. An optical redirector 420 includes a plurality of triangular prism components 421. The plurality of triangular prism components 421 are in a one-to-one correspondence with the plurality of pixels 411. Further, each triangular prism component 421 is configured to: first totally reflect received light emitted by a corresponding pixel 411, and then refract the totally reflected light to a focus of the near-eye display. The focus of the near-eye display falls within an eyeball of a user. It should be further noted that every two adjacent triangular prism components 421 in the plurality of triangular prism components 421 are disposed with a spacing therebetween, and a light-transmissive transparent substrate material is filled between every two adjacent triangular prism components 421. The transparent substrate material can enable external real-view light to pass through.

In one embodiment, the transparent substrate material filled between two adjacent triangular prism components 421 is the same as a transparent substrate material filled between two adjacent pixels 411.

In one embodiment, each triangular prism component 421 is bonded with a corresponding pixel 411 by using fourth glue. It should be noted that "fourth" herein is used to distinguish between glue disposed at different locations. For example, in this application, glue used to bond each refraction structure and a corresponding pixel may be referred to as first glue, glue used to bond each collimation lens and a corresponding pixel may be referred to as second glue, and glue used to bond each collimation lens and a corresponding refraction structure may be referred to as third glue. It should be learned that, the first, the second, the third, the fourth (the fifth and the sixth in the following), and the like in this application do not constitute a limitation on glue, but are used to distinguish between glue disposed at different locations.

In one embodiment, a side surface that is of each triangular prism component 421 and that is close to a corresponding pixel 411 is greater than or equal to a light emitting surface of the corresponding pixel 411. It is assumed that a surface that is of each triangular prism component 421 and that faces the corresponding pixel 411 is an upper surface of the triangular prism component 421, and a surface that is of each pixel 411 and that faces a corresponding triangular prism component 421 is a lower surface of the pixel 411. It should be learned that the lower surface of each pixel 411 is opposite to an upper surface of the corresponding triangular prism component 421. That a side surface that is of each triangular prism component 421 and that is close to a corresponding pixel 411 is greater than or equal to a light emitting surface of the corresponding pixel 411 is specifically that in a transmission direction of light emitted by each pixel 411, a projection of the lower surface of each pixel 411 on the upper surface of the corresponding triangular prism component 421 falls within the upper surface of the corresponding triangular prism component 421. In this way, more light emitted by each pixel 411 can enter the corresponding triangular prism component 421, so that each triangular prism component 421 can refract more light to the focus of the near-eye display.

In one embodiment, a distance between every two adjacent triangular prism components 421 is the same as a distance between two adjacent pixels 411 corresponding to the two adjacent triangular prism components 421. It should be learned that the lower surface of each pixel 411 is further exactly opposite to the upper surface of the corresponding triangular prism component 421. The "exactly opposite" may be that a central axis of each pixel 411 coincides with a central axis of the corresponding triangular prism component 421. The central axis of the pixel 411 is perpendicular to a plane in which the lower surface of the pixel 411 is located, and passes through a center of the lower surface of the pixel 411. It should be learned that, when the lower surface of the pixel 411 is not a plane, an extension direction of the central axis of the pixel 411 is the same as a thickness direction of the display panel 410. Correspondingly, the central axis of the corresponding triangular prism component 421 is a straight line that is perpendicular to a plane in which the upper surface of the corresponding triangular prism component 421 is located and that passes through a center of the upper surface of the corresponding triangular prism component 421. Similarly, when the upper surface of the corresponding triangular prism component 421 is not a plane, an extension direction of the central axis of the triangular prism component 421 is the same as the thickness direction of the display panel 410.

In one embodiment, each pixel 411 may be bonded with the corresponding triangular prism component 421 by using glue, and each pixel 411 and the corresponding triangular prism component 421 form one pixel component. To be specific, the near-eye display may include a plurality of pixel components that are disposed with a spacing therebetween, and a light-transmissive transparent substrate material is filled between every two adjacent pixel components. The external real-view light can pass through the transparent substrate material and enter an eye of the user.

It should be noted that the pixel 411 may be a monochrome pixel, or may be a three-primary-color pixel. When the pixel 411 is a monochrome pixel, each pixel 411 includes a light emitting unit of one color, such as a red light emitting unit, a green light emitting unit, or a blue light emitting unit. When the pixel 411 is a three-primary-color pixel, as shown in FIG. 21, each pixel 411 includes a red (R) light emitting unit, a green (G) light emitting unit, and a blue (B) light emitting unit.

In one embodiment, each pixel 411 includes K light emitting units, and correspondingly, each triangular prism component 421 also includes K triangular prisms. Herein, K is an integer greater than or equal to 1. In practice, a value of K may be 1, or may be 3. Further, K light emitting units in a same pixel 411 are in a one-to-one correspondence with K triangular prisms in a corresponding triangular prism component 421.

Figure 21:
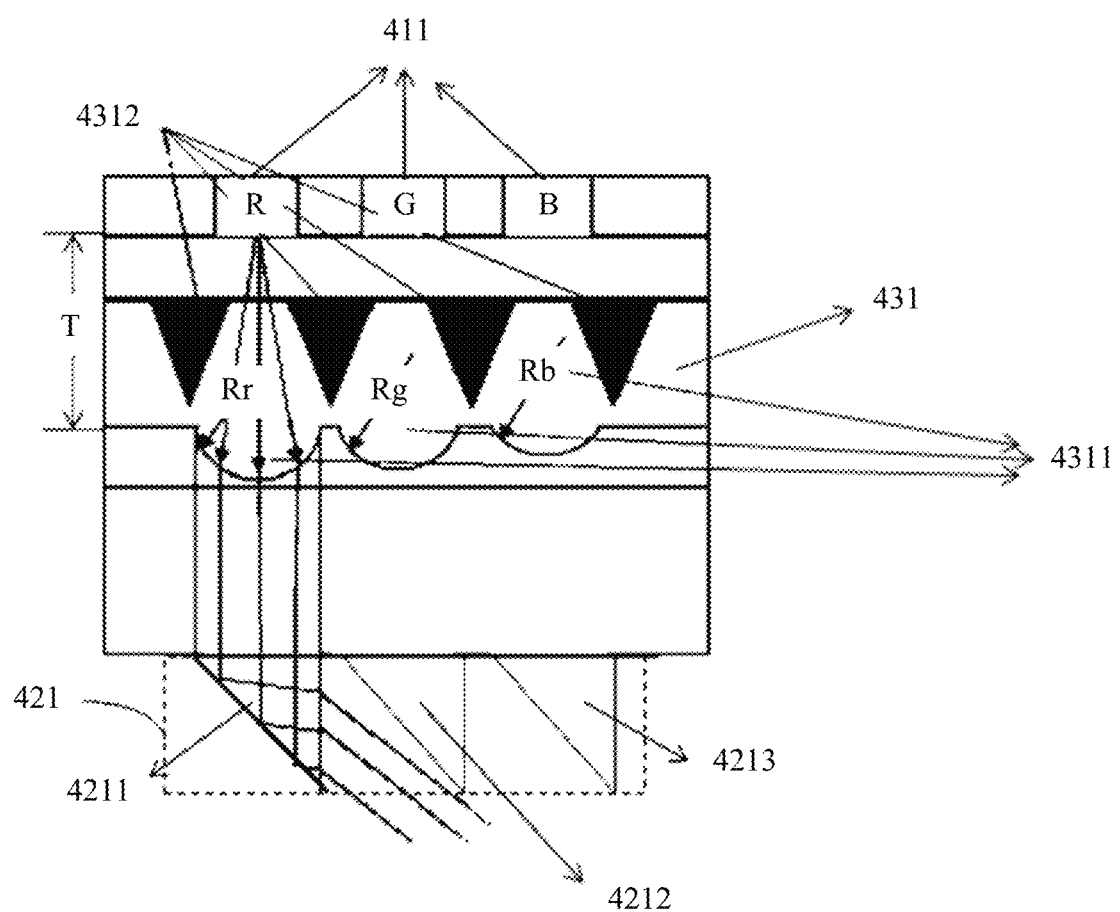
FIG. 21 is a side view of still another near-eye display according to this application.
Figure 22:
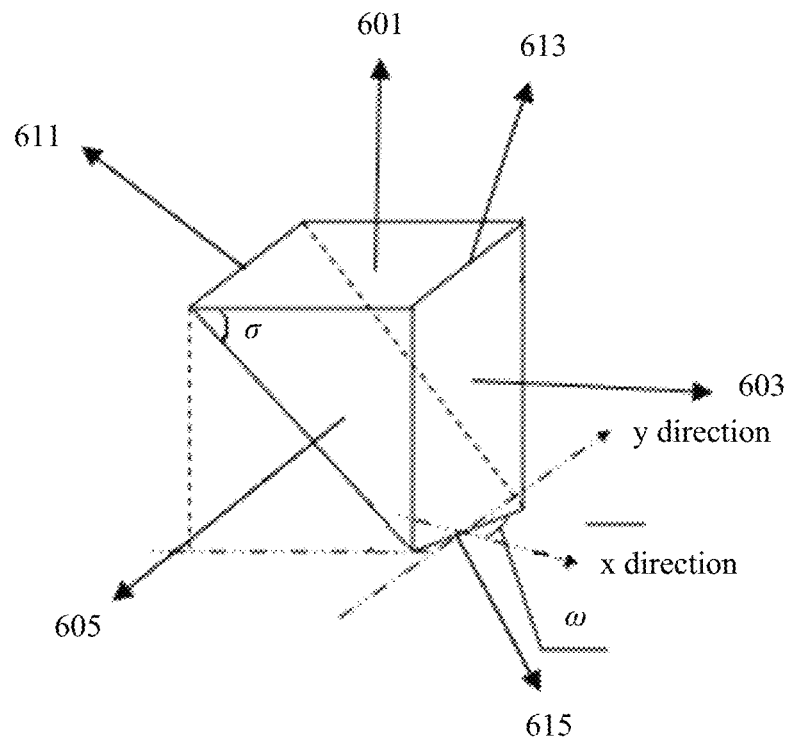
FIG. 22 is a structural diagram of a triangular prism according to this application.

Referring to FIG. 21, FIG. 21 is a side view of a near-eye display. In the near-eye display shown in FIG. 21, a value of K is 3. That is, each pixel 411 includes an R light emitting unit, a G light emitting unit, and a B light emitting unit, and correspondingly, each triangular prism component 421 includes a triangular prism 4211, a triangular prism 4212, and a triangular prism 4213. For each of the triangular prisms 4211 to 4213, refer to FIG. 22 and the following description. FIG. 22 is a structural diagram of a triangular prism according to this application.

As shown in FIG. 22, the triangular prism includes an upper surface 601 facing a display panel, a first side surface 603, and a second side surface 605. The upper surface 601 includes a first upper prism edge 613 and a second upper prism edge 611 that are opposite to each other. The first side surface 603 includes the first upper prism edge 613 and a lower prism edge 615 that are opposite to each other. The second side surface 605 includes the second upper prism edge 611 and the lower prism edge 615 that are opposite to each other. Further, the lower prism edge 615 is a line of intersection between the first side surface 603 and the second side surface 605. It should be further noted that, in a plurality of prism edges included in the triangular prism, the lower prism edge 615 is farthest from the upper surface 601. It should be noted that, in the plurality of prism edges included in the triangular prism, the lower prism edge 615 neither is located in the upper surface 601, nor intersects with the upper surface 601.

As described above, light emitting units are in a one-to-one correspondence with triangular prisms. Specifically, light emitted by each light emitting unit is input from an upper surface of a corresponding triangular prism, then is transmitted from the upper surface of the corresponding triangular prism to a second side surface, and is totally reflected at the second side surface. The totally reflected light is transmitted to a first side surface of the corresponding triangular prism, and is refracted at the first side surface. The refracted light is output from the first side surface to a focus of the near-eye display.

It should be noted that, in the near-eye display shown in FIG. 21, the light emitted by the light emitting unit is collimated light. It should be learned that the light emitted by the light emitting unit may be diverging light. This is not limited in this application. It should be further noted that, in FIG. 21, three rays of light emitted by the R light emitting unit are used only as an example for description. It should be learned that the light emitting unit in this application may emit a plurality of rays of light, and the plurality of rays of light emitted by each light emitting unit are transmitted to the focus of the near-eye display by using a corresponding triangular prism.

In order that each triangular prism can more accurately refract, to the focus of the near-eye display, the light emitted by the corresponding light emitting unit, a design of each triangular prism may meet the following requirements:

1. As shown in FIG. 22, a minimum included angle between the lower edge of the triangular prism and an x-axis is ω, and ω meets the following formula (5):

$$\omega = \arctan\left(\frac{K}{F}\right) \quad (5)$$

The x-axis is a straight line, and the x-axis is parallel to a straight line on which a line between centers of two eyeballs of the user is located. A y-axis is perpendicular to the x-axis. A plane in which the x-axis and the y-axis are located is a plane in which a surface that is of the display panel and that is away from a light emitting side is located. A straight line on which a line between a point of intersection between the x-axis and the y-axis and a center of a corresponding eyeball is located is perpendicular to the plane in which the surface that is of the display panel and that is away from the light emitting side is located. The corresponding eyeball means an eyeball used to receive the refracted light.

It should be noted that the "corresponding eyeball" is repeatedly mentioned in this application, and the "corresponding eyeball" is explained herein. As described above, the near-eye display in this application may be a lens. Correspondingly, the near-eye display corresponds to one eye (or one eyeball) of the user. The corresponding eyeball is an eyeball that is behind the near-eye display and that receives light transmitted by the near-eye display. The explanation herein is applied to the "corresponding eyeball" appearing anywhere in this application, and is not repeatedly provided elsewhere.

It should be noted that the minimum included angle is also repeatedly mentioned in this application, and the minimum included angle is explained herein. It should be learned that four included angles are formed when two lines intersect. The four included angles include two pairs of alternate angles. In other words, two of the four included angles are equal. It is assumed that the two included angles are P degrees. The other two included angles are also equal. It is assumed that the other two included angles are Q degrees. The minimum included angle is the smaller one in P degrees and Q degrees. For all the minimum included angles mentioned in this application, refer to the explanation herein, and details are not described again elsewhere.

2. As shown in FIG. 22, a minimum included angle σ between the second side surface and the upper surface of the triangular prism meets the following formula (6):

$$\sigma = \frac{1}{2}\arccos\left(-\frac{1}{m}\sin(\arctan(\eta))\right), \text{ where } \eta = \frac{r}{\sqrt{F^2 + K^2}} \quad (6)$$

F is a distance from a central point of the second side surface to the x-axis, K is a distance from the central point of the second side surface to the y-axis, m is a refractive index of a substrate material of the triangular prism, and r is a curvature radius of a near-eye display field-of-view arc surface.

It should be noted that, for the curvature radius r of the near-eye display field-of-view arc surface, refer to related limitation in the foregoing embodiments. Details are not described in this embodiment again.

By using the triangular prism that meets the foregoing design, the display panel can perform clearer imaging on a retina of the user, and an image is not blurred due to eye zoom of the user. It should be noted that, examples of the foregoing described formula (5) and formula (6) are intended to help a person skilled in the art better understand the embodiments of this application, instead of limiting the scope of the embodiments of this application. A person skilled in the art certainly can make various equivalent modifications or changes based on the provided examples of the formula (5) and the formula (6), and such modifications or changes also fall within the scope of the embodiments of this application.

In one embodiment, in order that as much light as possible emitted by the pixel is input into the triangular prism component, and the triangular prism component refracts as much light as possible to the focus of the near-eye display, the light emitted by the pixel may be collimated light (that is, parallel light). For example, an LED pixel that can emit collimated light may be used. As shown in FIG. 21, light emitted by each light emitting unit in the pixel is collimated light. Alternatively, a collimation lens may be used to perform collimation processing on diverging light emitted by the pixel.

Figure 23:
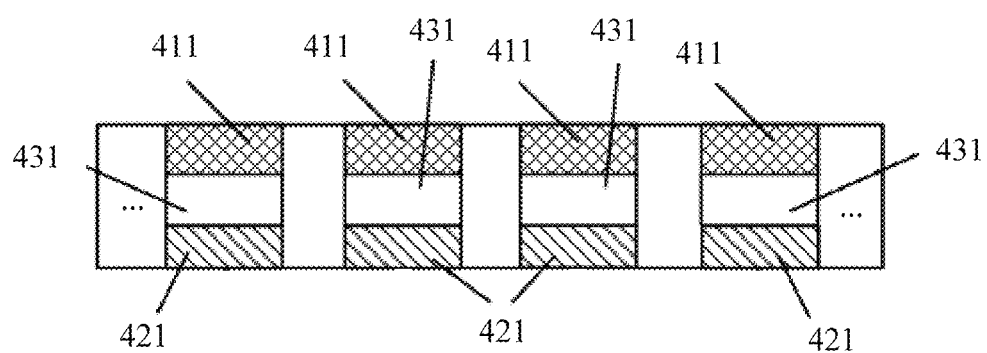
FIG. 23 is a side view of still another near-eye display according to this application.

Referring to FIG. 23, FIG. 23 is a side view of a near-eye display according to this application. In another embodiment of this application, as shown in FIG. 23, the near-eye display further includes a plurality of collimation lenses 431, and the plurality of collimation lenses 431 are in a one-to-one correspondence with a plurality of pixels 411. It can be learned from the foregoing limitation that the plurality of pixels 411 are in a one-to-one correspondence with a plurality of triangular prism components 421. Therefore, the plurality of collimation lenses 431 are also in a one-to-one correspondence with the plurality of triangular prism components 421. Specifically, each of the plurality of collimation lenses 431 is located between a corresponding pixel 411 and a corresponding triangular prism component 421, and each of the plurality of collimation lenses 431 is configured to: convert, into collimated light, light emitted by the corresponding pixel 411, and output the collimated light to the corresponding triangular prism component 421.

Further, every two adjacent collimation lenses 431 in the plurality of collimation lenses 431 are disposed with a spacing therebetween.

In one embodiment, a light-transmissive transparent substrate material is filled between every two adjacent collimation lenses 431 in the plurality of collimation lenses 431.

As described above, each collimation lens 431 is located between the corresponding pixel 411 and the corresponding triangular prism component 421. Optionally, one end of each collimation lens 431 is bonded with an end of the corresponding pixel 411 by using fifth glue, and the other end is bonded with an end of the corresponding triangular prism component 421 by using sixth glue.

Figure 24:
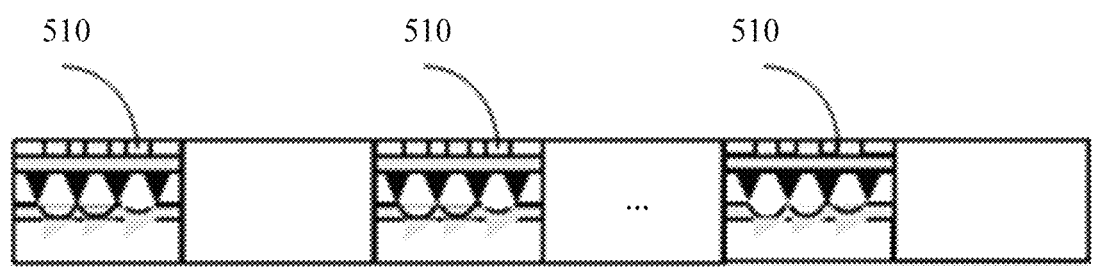
FIG. 24 is a side view of still another near-eye display according to this application.

In one embodiment, an upper surface of each collimation lens 431 is exactly opposite to a lower surface of the corresponding pixel 411, and a lower surface of each collimation lens 431 is exactly opposite to an upper surface of the corresponding triangular prism component 421. In other words, a central axis of the upper surface of each collimation lens 431, a central axis of the lower surface of the corresponding pixel 411, and a central axis of the upper surface of the corresponding triangular prism component 421 coincide with each other. Therefore, each collimation lens 431, the corresponding pixel 411, and the corresponding triangular prism component 421 form a pixel component 510 (as shown in FIG. 24, FIG. 24 shows a near-eye display according to this application). The near-eye display includes a plurality of pixel components 510, and every two adjacent pixel components 510 are disposed with a spacing therebetween. It should be learned that a transparent substrate material may be filled between every two adjacent pixel components 510, and external real-view light can pass through the transparent substrate material and enter an eye of a user.

The central axis of the upper surface of the collimation lens 431 is a straight line that is perpendicular to a plane in which the upper surface of the collimation lens 431 is located and that passes through a center of the upper surface of the collimation lens 431. When the upper surface of the collimation lens 431 is not a plane, an extension direction of the central axis is the same as a thickness direction of a display panel, and the central axis passes through the center of the upper surface of the collimation lens 431. In this application, for the "central axis of the lower surface of the corresponding pixel 411" and the "central axis of the upper surface of the corresponding triangular prism component 421", refer to the explanation about the "central axis of the upper surface of the collimation lens 431". They are similar, and details are not described herein again.

Further, a spacing between every two adjacent collimation lenses 431, a spacing between every two adjacent pixels 411, and a spacing between every two adjacent triangular prism components 421 may be the same.

In one embodiment, a refractive index of the fifth glue is the same as a refractive index of a substrate material of the collimation lens 431. In this way, the following case can be avoided: The fifth glue affects a focus of the collimation lens 431, and further affects a collimation effect. Optionally, the refractive index of the fifth glue, the refractive index of the substrate material of the collimation lens 431, and a refractive index of a substrate material of the triangular prism component 421 are the same.

In one embodiment, in this application, the foregoing second glue and the fifth glue herein are same glue, or a refractive index of the second glue is the same as the refractive index of the fifth glue.

In still another embodiment of this application, referring to FIG. 21 again, each collimation lens 431 may further include at least one collimation sub-lens 4311, and each pixel 411 includes at least one light emitting unit. The at least one collimation sub-lens 4311 in the same collimation lens 431 is in a one-to-one correspondence with the at least one light emitting unit in the corresponding pixel. Each collimation sub-lens 4311 is configured to convert, into collimated light, light emitted by a corresponding light emitting unit.

In one embodiment, each pixel 411 includes a red (R) light emitting unit, a green (G) light emitting unit, and a blue (B) light emitting unit, each collimation lens 431 includes three collimation sub-lenses 4311, and an R light emitting unit, a G light emitting unit, and a B light emitting unit in a same pixel are in a one-to-one correspondence with three collimation sub-lenses 4311 in a same collimation lens.

Correspondingly, a minimum distance T from each of the R light emitting unit, the G light emitting unit, and the B light emitting unit in the same pixel to each corresponding collimation sub-lens meets the following formula:

$$T = \frac{n_r}{n_r - n_{fr}} \times R_r = \frac{n_g}{n_g - n_{fg}} \times R_g = \frac{n_b}{n_b - n_{fb}} \times R_b,$$

where $R_r$ is a curvature radius of a collimation sub-lens corresponding to the R light emitting unit, $R_g$ is a curvature radius of a collimation sub-lens corresponding to the G light emitting unit, $R_b$ is a curvature radius of a collimation sub-lens corresponding to the B light emitting unit, $n_r$ is a refractive index of the substrate material of each collimation lens in red light, $n_g$ is a refractive index of the substrate material of each collimation lens in green light, $n_b$ is a refractive index of the substrate material of each collimation lens in blue light, $n_{fr}$ is a refractive index of the sixth glue in the R light, $n_{fg}$ is a refractive index of the sixth glue in the G light, and $n_{fb}$ is a refractive index of the sixth glue in the B light.

In one embodiment, as shown in FIG. 21, a light shielding groove 4312 may be further disposed between two adjacent collimation sub-lenses in a same collimation lens, and the light shielding groove 4312 is filled with a light absorption material. In this way, mutual interference between light emitted by adjacent light emitting units can be avoided.

In some embodiments, the optical redirector 320 includes a reflection structure 322, configured to reflect the image displayed on the display panel into the eye of the user.

In one embodiment, the reflection structure 322 is a Fresnel semi-reflective concave mirror, and a plane in which the plurality of pixels 301 in the display panel 310 are located is located between the Fresnel semi-reflective concave mirror and a focal plane of the Fresnel semi-reflective concave mirror.

Figure 14:
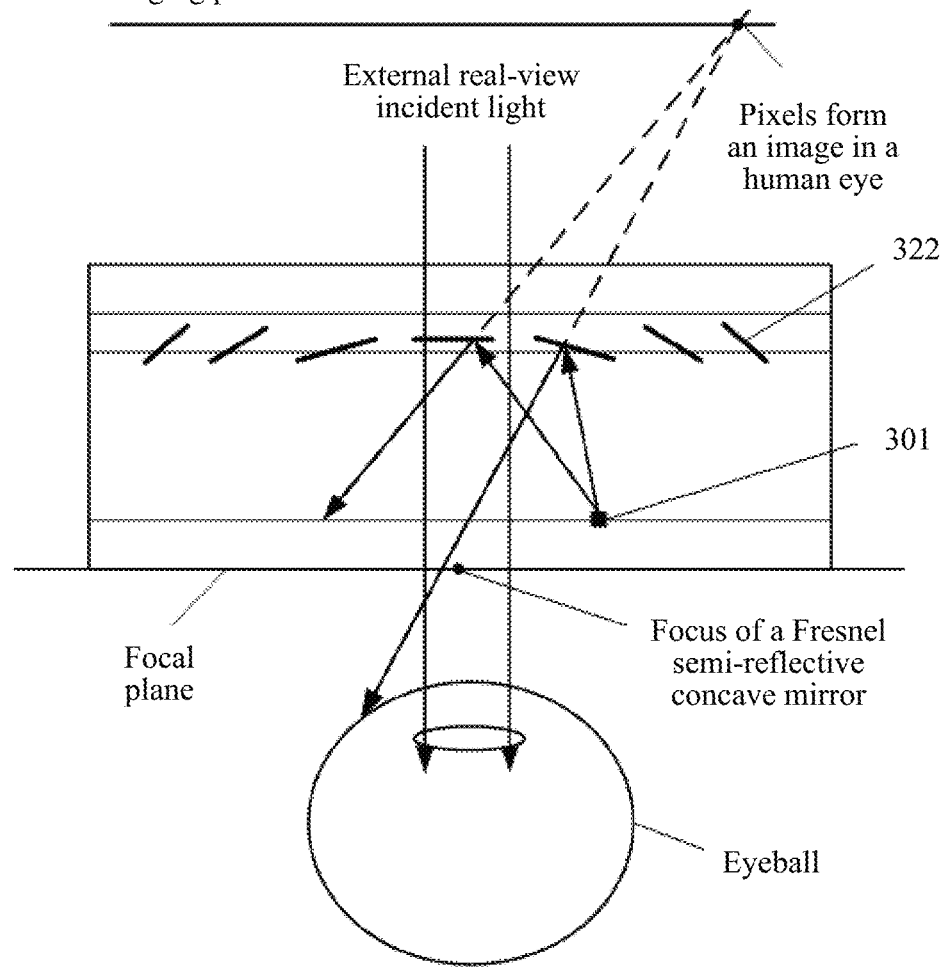
FIG. 14 is a schematic diagram of a principle of a near-eye display according to another embodiment of this application.

FIG. 14 is a schematic diagram of a principle of a near-eye display according to an embodiment of this application. The Fresnel semi-reflective concave mirror 322 may reflect the image displayed on the display panel 310 into the eye of the user. Specifically, the Fresnel semi-reflective concave mirror 322 reflects, into the eye of the user, rays of light emitted by the plurality of pixels 301, and reverse extension lines of the reflected rays of light form an upright magnified virtual image at a location at a specific distance from the eye of the user on a back of the Fresnel semi-reflective concave mirror. In addition, external real-view incident light can pass through the Fresnel semi-reflective concave mirror and enter the eye of the user. In this way, the eye of the user can view an AR image by superimposing the virtual image and the real-view image.

In some embodiments, a reflectivity of the Fresnel semi-reflective concave mirror may be 30%.

Figure 15:
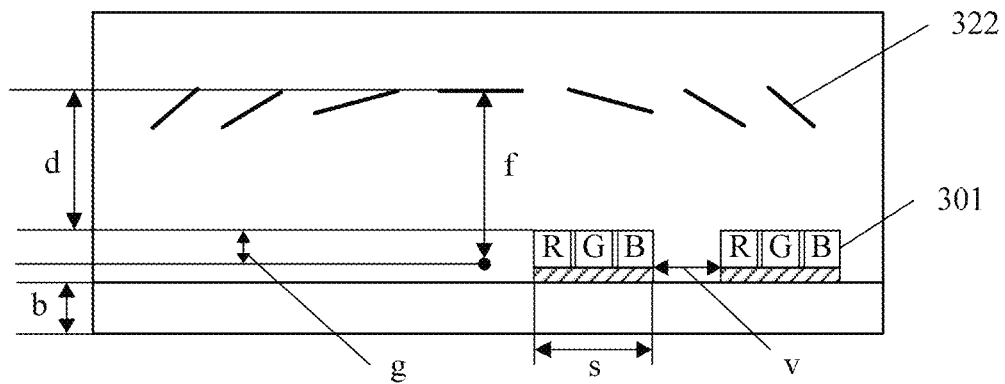
FIG. 15 is a side view of a near-eye display according to another embodiment of this application.

FIG. 15 is a schematic structural diagram of a near-eye display according to an embodiment of this application. An LED pixel is used as an example for description in FIG. 15. As shown in FIG. 15, a plurality of pixels 301 in a display panel 310 are disposed with a spacing therebetween on a transparent substrate. A Fresnel semi-reflective concave mirror 322 is bonded with the display panel 310 by using glue. A refractive index of the glue is the same as a refractive index of the Fresnel semi-reflective concave mirror.

Meanings of parameters in FIG. 15 are as follows:

b: a thickness of the transparent substrate on which the pixels 301 are disposed;

d: a distance from the Fresnel semi-reflective concave mirror to a plane in which the top of the pixels 301 is located;

f: a distance from a focus of the Fresnel semi-reflective concave mirror to a center reflection plane in which the Fresnel semi-reflective concave mirror is located;

u: a specified distance from an imaging plane to the Fresnel semi-reflective concave mirror;

g: a distance from the focus of the Fresnel semi-reflective concave mirror to the plane in which the top of the pixels 301 is located;

v: a spacing distance between adjacent pixels 301, where the spacing is used to allow projection of external real-view light to form an AR image; and s: a width of a reflection light shield layer beneath the pixel 301, where the light shield layer is configured to prevent light emitted by the pixel 301 from directly entering an eye of a user, so as to avoid interference to display.

In one embodiment, f meets the following formula:

$$\frac{1}{u} + \frac{1}{d} = \frac{1}{f}$$

Different values are selected for d and f, so that an image displayed on the display panel and an external real view can be superimposed when u ranges from 1 meter to 3 meters.

For example, when d=3 mm±1 μm, b=0.5 mm±0.05 mm, g=5 μm±1 μm, s=20 μm±1 μm, and v=20 μm±1 μm, a refractive index of the transparent substrate may be 1.5. In this design, a lens thickness of the near-eye display is approximately 3.5 mm. This can implement a 150-degree FOV. A distance from the pixel imaging plane to the eye of the user is approximately 1 meter.

It should be noted that the refraction structure and the Fresnel semi-reflective concave mirror are only some examples of the optical redirector, and do not constitute a limitation on the optical redirector provided in the embodiments of this application. A person skilled in the art certainly can make various equivalent modifications or changes based on the examples provided in the embodiments of this application, and such modifications or changes also fall within the scope of the embodiments of this application.

Figure 16:
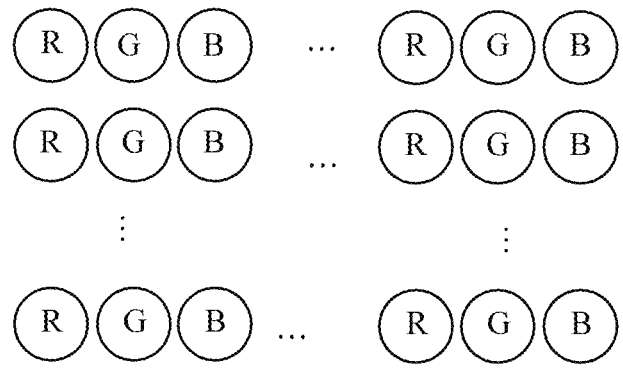
FIG. 16 is a schematic diagram of pixel arrangement of a near-eye display according to an embodiment of this application.
Figure 17:
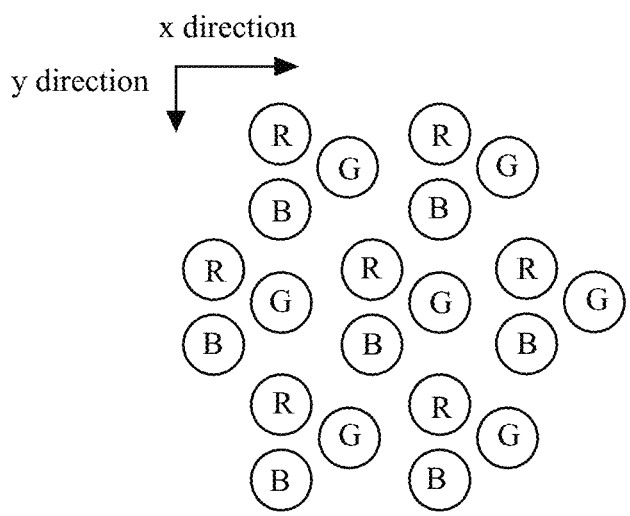
FIG. 17 is another schematic diagram of pixel arrangement of a near-eye display according to an embodiment of this application.

As described above, the plurality of pixels in the display panel in the embodiments of this application may be arranged in a plurality of manners. For example, the plurality of pixels in the display panel may be arranged in a manner shown in FIG. 16 or FIG. 17. In FIG. 16 and FIG. 17, an example in which one pixel includes R, G, and B light emitting units is used. Similarly, the plurality of light emitting units in each pixel may also be arranged in a plurality of arrangement manners. This is not limited in the embodiments of this application. For example, the plurality of light emitting units in each pixel may be arranged in a horizontal direction shown in FIG. 16, or may be arranged in a triangle shape shown in FIG. 17.

An arrangement manner shown in FIG. 17 is used as an example. It is assumed that 1445 pixels are arranged in an x direction, 1250 pixels are arranged in a y direction, a distance between two adjacent pixels in the x direction may be 34.59 μm, and a distance between two adjacent pixels in the y direction may be 24 μm. A minimum width of the near-eye display in the x direction is 1444×34.59 μm, and a minimum height in the y direction is 1249×24 μm.

It should be further noted that the glue in the foregoing embodiments may be transparent glue, and the transparent glue has relatively high light transmittance, so as to improve imaging quality of the near-eye display. The substrate material of the refraction structure and that of the reflection structure in the foregoing embodiments may be a transparent substrate material. A transparent substrate material used by the refraction structure, a transparent substrate material used by the reflection structure, and a transparent substrate material filled between adjacent pixels may be a same transparent substrate material, or may be different transparent substrate materials. This is not limited in the embodiments of this application.

Figure 18:
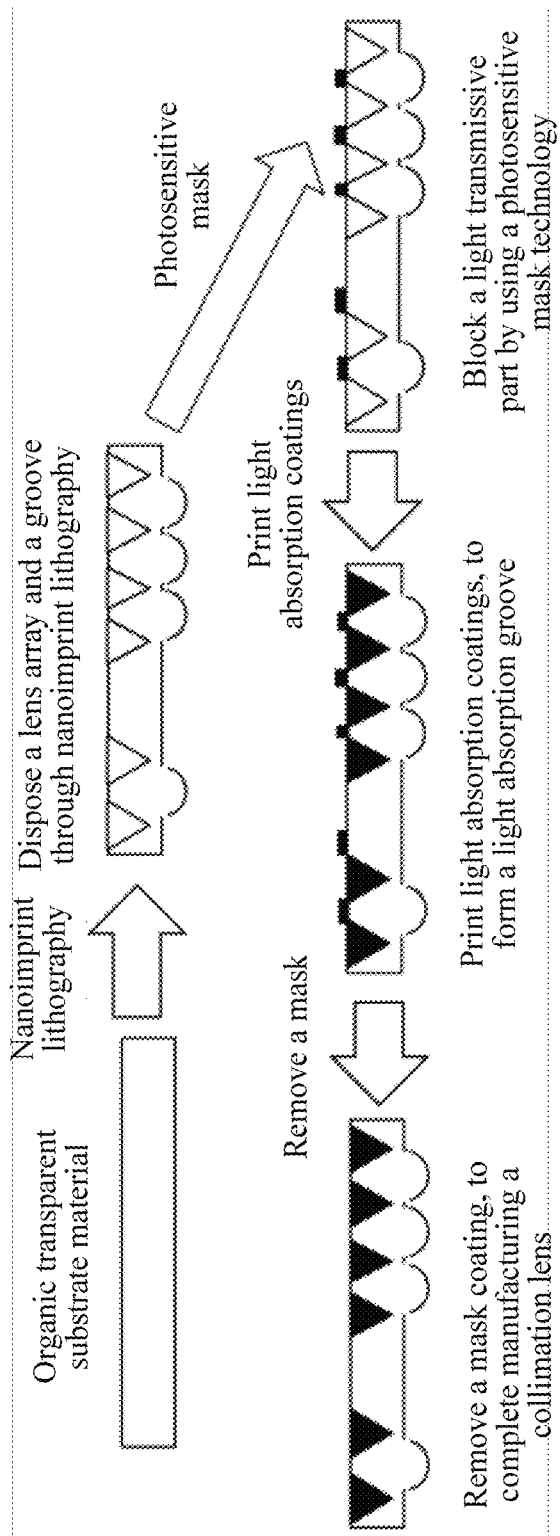
FIG. 18 is a flowchart of a technological manufacturing process of a collimation lens according to an embodiment of this application.

FIG. 18 is a schematic flowchart of a technological manufacturing process of a collimation lens in a near-eye display according to an embodiment of this application. As shown in FIG. 18, the technological manufacturing process is as follows:

Operation 1: Dispose a lens array and a groove on an organic transparent substrate material by using a nanoimprint lithography technology.

Operation 2: Block a light transmissive part of the lens array by using a photosensitive mask technology.

Operation 3: Print light absorption coatings on surfaces of the lens array and the groove, to form a light absorption groove.

Operation 4: Remove a mask material on the light transmissive part, to complete manufacturing a collimation lens.

It should be understood that FIG. 18 is only an example of a technological manufacturing process of a collimation lens. The embodiments of this application are not limited thereto.

Figure 19:
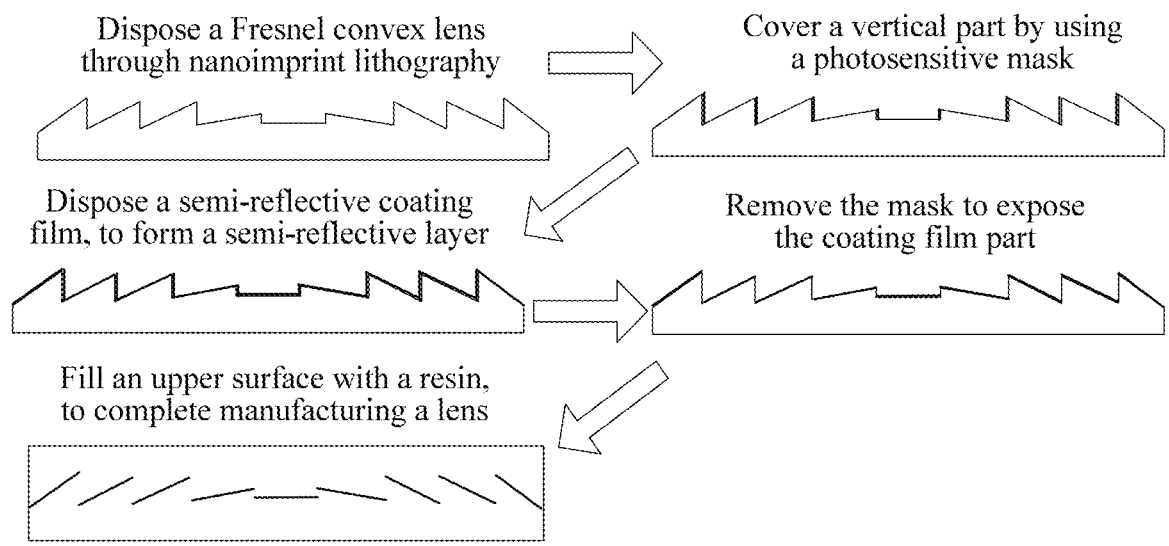
FIG. 19 is a flowchart of a technological manufacturing process of a Fresnel semi-reflective concave mirror according to an embodiment of this application.

FIG. 19 is a schematic flowchart of a technological manufacturing process of a Fresnel semi-reflective concave mirror in a near-eye display according to an embodiment of this application. As shown in FIG. 19, the technological manufacturing process is as follows:

Operation 1: Dispose a Fresnel convex lens on a selected transparent resin substrate material by using a nanoimprint lithography technology.

Operation 2: Cover a vertical part of the Fresnel convex lens by using a photosensitive mask technology.

Operation 3: Dispose a semi-reflective coating film on an upper surface of the Fresnel semi-reflective convex mirror, to form a semi-reflective layer.

Operation 4: Remove the vertical part.

Operation 5: Fill the upper surface of the Fresnel convex lens with a resin, to complete manufacturing a Fresnel semi-reflective concave mirror.

It should be understood that FIG. 19 is only an example of a technological manufacturing process of a Fresnel semi-reflective concave mirror. The embodiments of this application are not limited thereto.

The foregoing descriptions are merely specific implementations in the embodiments of this application. The protection scope of the embodiments of this application is not limited thereto. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A near-eye display, comprising:
a display panel; having a plurality of pixels that are disposed in a tiling manner, every two adjacent pixels in the plurality of pixels are disposed with a spacing therebetween, and a first light-transmissive transparent substrate material is filled between every two adjacent pixels; and
a collimation lens component and an optical redirector that are successively disposed on a light emitting side of the display panel, wherein
the collimation lens component comprises a plurality of collimation lenses, the plurality of collimation lenses are in a one-to-one correspondence with the plurality of pixels, each of the plurality of collimation lenses is configured to: convert, into collimated light, light emitted by a corresponding pixel, and input the collimated light into the optical redirector, every two adjacent collimation lenses in the plurality of collimation lenses are disposed with a spacing therebetween, and a second light-transmissive transparent substrate material is filled between every two adjacent collimation lenses; and
the optical redirector comprises a plurality of light convergence structures, the plurality of light convergence structures are in a one-to-one correspondence with the plurality of collimation lenses, each of the plurality of light convergence structures is configured to converge, on a focus of the near-eye display, collimated light input by a corresponding collimation lens, the focus of the near-eye display falls within an eyeball of a user, every two adjacent light convergence structures in the plurality of light convergence structures are disposed with a spacing therebetween, and a third light-transmissive transparent substrate material is filled between every two adjacent light convergence structures.

2. The near-eye display according to claim 1, wherein each of the plurality of pixels comprises at least one light emitting unit, a collimation lens corresponding to each pixel comprises at least one collimation sub-lens that is in a one-to-one correspondence with the at least one light emitting unit, and each collimation sub-lens converts, into collimated light, light emitted by a light emitting unit corresponding to each collimation sub-lens.

3. The near-eye display according to claim 2, wherein each pixel comprises a red light emitting unit, a green light emitting unit, and a blue light emitting unit, each collimation lens comprises three collimation sub-lenses, and a red light emitting unit, a green light emitting unit, and a blue light emitting unit in a same pixel are in a one-to-one correspondence with three collimation sub-lenses in a same collimation lens; and
a minimum distance T from each of the red light emitting unit, the green light emitting unit, and the blue light emitting unit in the same pixel to each corresponding collimation sub-lens meets the following formula:

$$T = \frac{n_r}{n_r - n_{fr}} \times R_r = \frac{n_g}{n_g - n_{fg}} \times R_g = \frac{n_b}{n_b - n_{fb}} \times R_b,$$

wherein $R_r$, $R_g$, and $R_b$ are respectively curvature radiuses of the collimation sub-lenses respectively corresponding to the red light emitting unit, the green light emitting unit, and the blue light emitting unit in the same pixel, $n_r$, $n_g$, and $n_b$ are respectively refractive indexes of substrate materials of the collimation sub-lenses in red light, green light, and blue light, and $n_{fr}$, $n_{fg}$, and $n_{fb}$ are respectively refractive indexes of filling materials between the collimation sub-lenses and corresponding light convergence structures in the red light, the green light, and the blue light.

4. The near-eye display according to claim 2, wherein a light shielding groove is disposed between two adjacent collimation sub-lenses in a same collimation lens, and the light shielding groove is filled with a light absorption material.

5. The near-eye display according to claim 2, wherein a light convergence structure corresponding to each collimation lens comprises a light convergence sub-structure that is in a one-to-one correspondence with the at least one collimation sub-lens, and each light convergence sub-structure converges, on the focus of the near-eye display, collimated light emitted by a collimation sub-lens corresponding to each light convergence sub-structure.

6. The near-eye display according to claim 5, wherein the light convergence sub-structure is a refraction structure, the refraction structure comprises a first refraction surface, and the first refraction surface refracts, to the focus of the near-eye display, collimated light emitted by a collimation sub-lens corresponding to the refraction structure.

7. The near-eye display according to claim 6, wherein the first refraction surface is a first refraction plane, the first refraction plane is located on a side that is of the refraction structure and that is close to the display panel, a line of intersection exists between a plane in which the refraction plane is located and a plane in which a second refraction plane that is of the refraction structure and that is away from the display panel is located, a minimum included angle between the line of intersection and an x-axis is Φ the x-axis is a straight line, the x-axis is parallel to a straight line on which a line between centers of two eyeballs of the user is located, and Φ meets the following formula:

$$\Phi = \arctan\left(\frac{L}{D}\right);$$

and a minimum included angle θ between a plane in which each first refraction plane is located and the plane in which the second refraction plane of the refraction structure is located meets the following formula:

$$\theta = \text{argcotan}\left(\frac{n \times \cos\left(\arcsin\left(\frac{\mu}{n}\right)\right) - n_f}{\mu}\right), \text{ where}$$

$$\mu = \frac{\sqrt{D^2 + L^2}}{\sqrt{D^2 + L^2 + r^2}},$$

and

D is a distance from a central point of each first refraction plane to the x-axis, L is a distance from the central point of each first refraction plane to a y-axis, n is a refractive index of a substrate material of the refraction structure, $n_f$ is a refractive index of a filling material between the refraction structure and a corresponding collimation sub-structure, r is a curvature radius of a near-eye display field-of-view arc surface, the y-axis is perpendicular to the x-axis, a plane in which the x-axis and the y-axis are located is a plane in which a surface that is of the display panel and that is away from the light emitting side is located, a straight line on which a line between a point of intersection between the x-axis and the y-axis and a center of a corresponding eyeball is located is perpendicular to the plane in which the x-axis and the y-axis are located, and the corresponding eyeball means an eyeball used to receive the refracted light.

8. The near-eye display according to claim 5, wherein the light convergence sub-structure is a reflection structure, the reflection structure comprises a first reflection surface, and the first reflection surface reflects, to the focus of the near-eye display, collimated light emitted by a collimation sub-lens corresponding to the reflection structure.

9. The near-eye display according to claim 8, wherein the first reflection surface is a first reflection plane, the reflection structure further comprises a third refraction plane, the first reflection plane totally reflects the collimated light emitted by the collimation sub-lens corresponding to the reflection structure, the totally reflected light is refracted at the third refraction plane, and the refracted light is output to the focus of the near-eye display.

10. The near-eye display according to claim 9, wherein the reflection structure is a triangular prism, the triangular prism comprises an upper surface facing the display panel, a first upper prism edge and a second upper prism edge that are opposite to each other in the upper surface, a lower prism edge away from the upper surface, the first reflection plane, and the third refraction plane, the first upper prism edge and the lower prism edge are opposite to each other and are both located in the third refraction plane, the second upper prism edge and the lower prism edge are opposite to each other and are both located in the first reflection plane, and the lower prism edge is a line of intersection between the third refraction plane and the first reflection plane; and light emitted by each of the at least one light emitting unit is input from an upper surface of a corresponding triangular prism, and is totally reflected at the first reflection plane, the totally reflected light is refracted at the third refraction plane, and the refracted light is output to the focus of the near-eye display.

11. The near-eye display according to claim 10, wherein a minimum included angle between the lower prism edge of the triangular prism and an x-axis is ω, and ω meets:

$$\omega = \arctan\left(\frac{K}{F}\right),$$

and the x-axis is a straight line, the x-axis is parallel to a straight line on which a line between centers of two eyeballs of the user is located, a y-axis is perpendicular to the x-axis, a plane in which the x-axis and the y-axis are located is a plane in which a surface that is of the display panel and that is away from the light emitting side is located, a straight line on which a line between a point of intersection between the x-axis and the y-axis and a center of a corresponding eyeball is located is perpendicular to the plane in which the surface that is of the display panel and that is away from the light emitting side is located, and the corresponding eyeball means an eyeball used to receive the refracted light; and a minimum included angle σ between the first reflection plane and the upper surface in the same triangular prism meets the following formula:

$$\sigma = \frac{1}{2}\arccos\left(-\frac{1}{m}\sin(\arctan(\eta))\right), \text{ where } \eta = \frac{r}{\sqrt{F^2 + K^2}},$$

and

F is a distance from a central point of the first reflection plane to the x-axis, K is a distance from the central point of the first reflection plane to the y-axis, m is a refractive index of a substrate material of the triangular prism, and r is a curvature radius of a near-eye display field-of-view arc surface.

12. The near-eye display according to claim 7, wherein the curvature radius r of the near-eye display field-of-view arc surface meets the following formula:

$$r = S + P \times \arctan\frac{\alpha}{2},$$

wherein

S is a distance from a center of the display panel to a pupil center of the user, α is a maximum visual angle of an eye, and P is a pupil radius of the user.

13. A near-eye display system, comprising:
a near-eye display comprises a display panel and a collimation lens component and an optical redirector that are successively disposed on a light emitting side of the display panel, wherein the display panel comprises a plurality of pixels that are disposed in a tiling manner, every two adjacent pixels in the plurality of pixels are disposed with a spacing therebetween, and a light-transmissive transparent substrate material is filled between every two adjacent pixels;

the collimation lens component comprises a plurality of collimation lenses, the plurality of collimation lenses are in a one-to-one correspondence with the plurality of pixels, each of the plurality of collimation lenses is configured to: convert, into collimated light, light emitted by a corresponding pixel, and input the collimated light into the optical redirector, every two adjacent collimation lenses in the plurality of collimation lenses are disposed with a spacing therebetween, and a light-transmissive transparent substrate material is filled between every two adjacent collimation lenses; and the optical redirector comprises a plurality of light convergence structures, the plurality of light convergence structures are in a one-to-one correspondence with the plurality of collimation lenses, each of the plurality of light convergence structures is configured to converge, on a focus of the near-eye display, collimated light input by a corresponding collimation lens, the focus of the near-eye display falls within an eyeball of a user, every two adjacent light convergence structures in the plurality of light convergence structures are disposed with a spacing therebetween, and a light-transmissive transparent substrate material is filled between every two adjacent light convergence structures, a transceiver, a drive chip, and a battery, wherein the transceiver is configured to: receive an image signal, and transmit the image signal to the drive chip;

the drive chip is configured to drive, based on the image signal received by the transceiver, the near-eye display to display an image;

the near-eye display is configured to: display the image under the control of the drive chip, and project the displayed image into an eye of a user; and the battery is configured to supply power to the near-eye display system.

14. The near-eye display system according to claim 13, wherein each of the plurality of pixels comprises at least one light emitting unit, a collimation lens corresponding to each pixel comprises at least one collimation sub-lens that is in a one-to-one correspondence with the at least one light emitting unit, and each collimation sub-lens converts, into collimated light, light emitted by a light emitting unit corresponding to each collimation sub-lens.

15. The near-eye display system according to claim 14, wherein each pixel comprises a red light emitting unit, a green light emitting unit, and a blue light emitting unit, each collimation lens comprises three collimation sub-lenses, and a red light emitting unit, a green light emitting unit, and a blue light emitting unit in a same pixel are in a one-to-one correspondence with three collimation sub-lenses in a same collimation lens; and a minimum distance T from each of the red light emitting unit, the green light emitting unit, and the blue light emitting unit in the same pixel to each corresponding collimation sub-lens meets the following formula:

$$T = \frac{n_r}{n_r - n_{fr}} \times R_r = \frac{n_g}{n_g - n_{fg}} \times R_g = \frac{n_b}{n_b - n_{fb}} \times R_b,$$

wherein $R_r$, $R_g$, and $R_b$ are respectively curvature radiuses of the collimation sub-lenses respectively corresponding to the red light emitting unit, the green light emitting unit, and the blue light emitting unit in the same pixel, $n_r$, $n_g$, and $n_b$ are respectively refractive indexes of substrate materials of the collimation sub-lenses in red light, green light, and blue light, and $n_{fr}$, $n_{fg}$, and $n_{fb}$ are respectively refractive indexes of filling materials between the collimation sub-lenses and corresponding light convergence structures in the red light, the green light, and the blue light.

16. The near-eye display system according to claim 14, wherein a light shielding groove is disposed between two adjacent collimation sub-lenses in a same collimation lens, and the light shielding groove is filled with a light absorption material.

17. The near-eye display system according to claim 14, wherein a light convergence structure corresponding to each collimation lens comprises a light convergence sub-structure that is in a one-to-one correspondence with the at least one collimation sub-lens, and each light convergence sub-structure converges, on the focus of the near-eye display, collimated light emitted by a collimation sub-lens corresponding to each light convergence sub-structure.

18. The near-eye display system according to claim 17, wherein the light convergence sub-structure is a refraction structure, the refraction structure comprises a first refraction surface, and the first refraction surface refracts, to the focus of the near-eye display, collimated light emitted by a collimation sub-lens corresponding to the refraction structure.

* * * * *